United States Patent
Buerger et al.

(10) Patent No.: US 10,168,674 B1
(45) Date of Patent: Jan. 1, 2019

(54) SYSTEM AND METHOD FOR OPERATOR CONTROL OF HETEROGENEOUS UNMANNED SYSTEM TEAMS

(71) Applicant: National Technology & Engineering Solutions of Sandia, LLC, Albuquerque, NM (US)

(72) Inventors: Stephen Buerger, Albuquerque, NM (US); Joshua Alan Love, Albuquerque, NM (US); Jason C. Neely, Albuquerque, NM (US); Wendy A. Amai, Albuquerque, NM (US); Charles Q. Little, Peralta, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 96 days.

(21) Appl. No.: 14/258,986

(22) Filed: Apr. 22, 2014

Related U.S. Application Data

(60) Provisional application No. 61/814,717, filed on Apr. 22, 2013.

(51) Int. Cl.
   *G05B 15/02* (2006.01)
   *G05D 1/02* (2006.01)

(52) U.S. Cl.
   CPC ............. *G05B 15/02* (2013.01); *G05D 1/027* (2013.01); *Y10S 901/47* (2013.01)

(58) Field of Classification Search
   CPC .... G05B 19/41815; G05B 2219/39146; G05B 2219/40417; G05B 15/02; B25J 9/1669;
   (Continued)

(56) References Cited

U.S. PATENT DOCUMENTS 6,122,572 A * 9/2000 Yavnai ................. G05D 1/0088
                                                342/13
7,266,532 B2 * 9/2007 Sutton ..................... H04L 29/06
                                                706/12

(Continued)

OTHER PUBLICATIONS

Buerger et al. "A Layered Control Architecture for Single-Operator Control of Heterogeneous unmanned system teams", SPIE, Apr. 2012.*

(Continued)

*Primary Examiner* — Rachid Bendidi
(74) *Attorney, Agent, or Firm* — Daniel J. Jenkins

(57) ABSTRACT

A control architecture and associated control methods are under development to allow a single user to control a team of multiple heterogeneous UMS as they conduct multifaceted (i.e. multi-objective) missions in real time is disclosed. The control architecture is hierarchical, modular and layered and enables operator interaction at each layer, ensuring the human operator is in close control of the unmanned team at all times. The architecture and key data structures are introduced. Two approaches to distributed collaborative control of heterogeneous unmanned systems are described, including an extension of homogeneous swarm control and a novel application of distributed model predictive control. Initial results are presented, demonstrating heterogeneous UMS teams conducting collaborative missions.

34 Claims, 24 Drawing Sheets

(58) Field of Classification Search
CPC ...... B25J 9/1689; B25J 9/1668; B25J 9/1674; B25J 9/1697; G05D 1/0027; G05D 2201/0209; G05D 1/0088; G05D 1/104; Y02P 90/08; Y02P 90/18
USPC .................................... 700/245–264; 901/47
See application file for complete search history.

(56) References Cited

U.S. PATENT DOCUMENTS

| | | | | |
|---|---|---|---|---|
| 8,494,689 | B1* | 7/2013 | Ashton | G06F 17/00 318/135 |
| 2004/0162638 | A1* | 8/2004 | Solomon | F41H 13/00 700/247 |
| 2006/0079997 | A1* | 4/2006 | McLurkin | G06N 3/008 700/245 |
| 2006/0265103 | A1* | 11/2006 | Orita | G05D 1/0251 700/245 |
| 2007/0021880 | A1* | 1/2007 | Appleby | G05D 1/104 701/23 |
| 2007/0168057 | A1* | 7/2007 | Blevins | G05B 13/022 700/53 |
| 2008/0004749 | A1* | 1/2008 | Hostettler | G05D 1/0044 700/245 |
| 2008/0009969 | A1* | 1/2008 | Bruemmer | G06N 3/008 700/245 |
| 2008/0215204 | A1* | 9/2008 | Roy | G05D 1/0044 701/28 |
| 2009/0064169 | A1* | 3/2009 | Nguyen | G01S 13/726 718/105 |
| 2009/0222149 | A1* | 9/2009 | Murray | A63H 30/04 701/2 |
| 2009/0306823 | A1* | 12/2009 | Baltes | G05D 1/0274 700/245 |
| 2009/0326735 | A1* | 12/2009 | Wood | G05D 1/0027 701/2 |
| 2010/0217438 | A1* | 8/2010 | Kawaguchi | B25J 9/1661 700/248 |
| 2010/0332281 | A1* | 12/2010 | Horvitz | G06Q 10/06311 705/7.13 |
| 2011/0054684 | A1* | 3/2011 | Seo | G05B 19/0421 700/248 |
| 2011/0283285 | A1* | 11/2011 | Saad | G06Q 10/0631 718/102 |
| 2013/0123980 | A1* | 5/2013 | Seo | B25J 9/1669 700/248 |
| 2014/0074339 | A1* | 3/2014 | Casado | G05D 1/0088 701/24 |
| 2014/0108663 | A1* | 4/2014 | Peters | H04L 47/70 709/226 |
| 2014/0229221 | A1* | 8/2014 | Shih | G06Q 10/06313 705/7.23 |
| 2014/0236391 | A1* | 8/2014 | Wood | G05D 1/0027 701/2 |
| 2014/0249693 | A1* | 9/2014 | Stark | B64C 39/024 701/2 |
| 2014/0298231 | A1* | 10/2014 | Saito | G06F 3/0484 715/771 |

OTHER PUBLICATIONS

Bertuccelli et al. "Robust Planning for Coupled Cooperative UAV Missions", IEEE, Dec. 2004.*
Feddema, et al. "Decentralized Control of Cooperative Robotic Vehicles: Theory and Application", IEEE, Oct. 2002.*
Bernardine et al. "Market-Based Multirobot Coordination: A Survey and Analysis", IEEE, Jul. 2006.*
Sujit, et al. "Distributed Sequential Auctions for Multiple UAV Task Allocation", American Control, Jul. 2007.*
Vincent, et al. "Distributed multirobot exploration, mapping, and task allocation", AMAI, Mar. 2008.*
Ryan et al. "Decentralized Control of Unmanned Aerial Vehicle Collaborative Sensing Missions", Jul. 9, 2007, American Control Conference.*
Sandholm, Algorithm for optimal winner determination in combination auctions, Feb. 2002, Artificial Intelligence, ELsevier.*

* cited by examiner

SYSTEM AND METHOD FOR OPERATOR CONTROL OF HETEROGENEOUS UNMANNED SYSTEM TEAMS

CROSS-REFERENCE TO RELATED APPLICATIONS

This application claims benefit of U.S. Provisional Patent Application No. 61/814,717, "A SYSTEM AND METHOD FOR SINGLE-OPERATOR CONTROL OF HETEROGENEOUS UNMANNED SYSTEM TEAMS", filed Apr. 22, 2013, which is incorporated by reference herein in its entirety.

GOVERNMENT RIGHTS

The Government has rights to this invention pursuant to Contract No. DE-AC04-94AL85000 awarded by the U.S. Department of Energy.

FIELD

The invention relates generally to the control of unmanned systems (UMS), and more particularly to systems and methods that allow a single human operator to control teams of multiple heterogeneous UMS.

BACKGROUND OF THE INVENTION

The widespread adoption of aerial, ground and sea-borne unmanned systems (UMS) for national security applications provides many advantages, most notably allowing people physical separation from dangerous tasks and environments. However, achieving effective high-performance control over UMS with limited manpower is a significant challenge, and most UMS deployed today require multiple-member operating crews. The control challenge is amplified dramatically when large numbers of UMS must work together, when the environment is complex, and when hostile adversaries are present Furthermore, existing control methods are expected to be ineffective in directing cooperating teams of UMS operating in close proximity in rapidly-changing missions against dynamic and unpredictable adversaries. Autonomous UMS control is desired but technological, policy and cultural hurdles are expected to preclude the use of unsupervised autonomous solutions for the foreseeable future.

What is needed are systems and methods that enable a single operator to control UMS teams.

SUMMARY OF THE INVENTION

The present invention overcomes these difficulties encountered with prior art indoor real-time positioning systems.

According to an embodiment of the invention, a method is disclosed that includes the steps of assigning an objective to one or more agents by a user; estimating a cost to perform the objective by one or more agents; determining control instructions to be executed by one or more agents; executing the objective while minimizing a total cost of the objective; and transmitting sensor data from at least one of the one or more agents to the user.

According to another embodiment of the invention, a non-transitory machine-readable medium in communication with at least one processor, the non-transitory machine-readable medium storing a system architecture having instructions, which, when executed by the at least one processor of a machine, causes one or more agents to perform one or more operations selected from a group consisting of moving to a location, delivering a package, and obtaining sensor data is disclosed. The non-transitory machine-readable medium includes a system architecture including a high level optimizer that receives an objective from a user and a mid-level behavior controller that receives an assignment list from the high level optimizer and provides an objective cost list to the high level optimizer thereby optimizing the objective performed by the one or more agents.

According to another embodiment of the invention, a system is disclosed that includes a user interface; at least one processor of a machine; a high level optimizer module configured to receive an objective from the user interface; a mid-level behavior controller module configured to determine a cost associated with the one or more agents performing the objective; and one or more agents configured to receive the objective from the mid-level behavior controller module.

An object of the present invention is to reduce the time and cost to perform a remote mission by an autonomous agent.

Another object of the present invention is to allow a single operator to produce desired behaviors by agents by expressing and prioritizing desired outcomes for the system instead of for individual agents.

Another object of the present invention is to increase the number of tasks completed per unit time by a team of unmanned agents by enabling their direct collaboration.

Another object of the present invention is to increase the certainty that critical tasks are executed by unmanned agents.

An advantage of the present invention is to reduce the communications bandwidth to complete missions by unmanned agents.

Another advantage of the present invention is to reduce the level of human interaction required to complete missions by multiple unmanned agents.

Another advantage of the present invention is to realize novel feasible and optimal mission solutions that may not be apparent to an operator.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
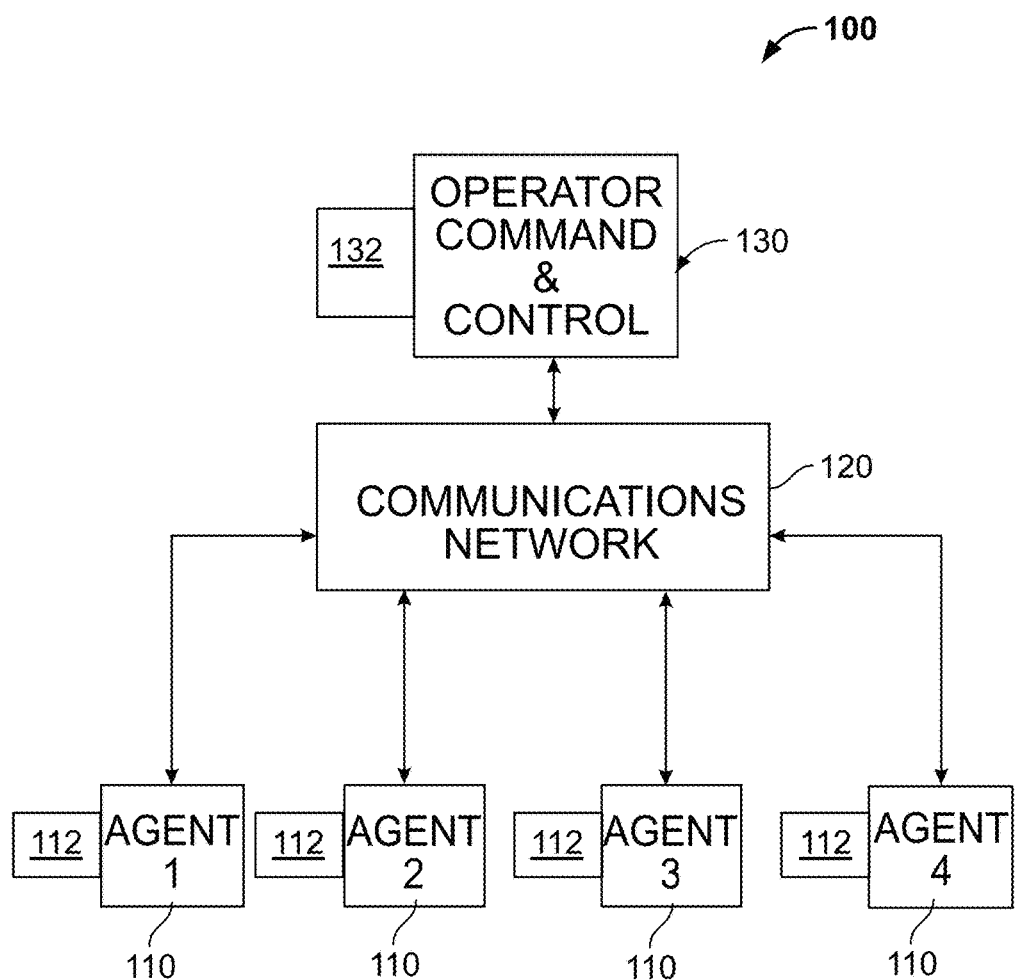
FIG. 1 illustrates an embodiment of a system and method for heterogeneous UMS control according to the present disclosure.

The present disclosure is directed to systems and methods that allow a human operator to control teams of multiple heterogeneous unmanned systems (UMS), which may be referred to in this disclosure as agents. In an embodiment, the human operator may be a single human operator. The UMS can perform multiple simultaneous heterogeneous tasks. The human operator applies high level perception and tactical reasoning, while the system automates lower level decisions. The system is highly modular and includes an architecture for data sharing among system assets or agents (individual UMS), layered control algorithms including a high level optimizer, mid-level behavior estimators and controllers, and low level asset controllers. The system includes a model-based interface to the human operator that allows the operator to control the system by defining desired outcomes, and to monitor system performance. The operator can also bypass high level control and control agents at lower levels The present disclosure is further directed to a hierarchical, modular and layered control architecture that enables operator interaction at each layer, ensuring the human operator is in close control of the unmanned team at all times. The architecture and key data structures are disclosed. Two approaches to distributed collaborative control of heterogeneous unmanned systems are described, including a method of swarm control and a method of distributed model predictive control.

The present disclosure is further directed to a flexible control architecture that blends elements of swarm control and task assignment methods while taking advantage of continuing advances in platform-level autonomy (e.g. autonomous navigation). This approach uses an intimate man-in-loop command and control scheme for small teams of UMS executing multiple tasks while responding to changing conditions. The primary goal is to automate feasible component behaviors, while leaving more challenging behaviors such as high-level perception and tactics to a human operator, enabling a single operator to effectively control multiple UMS.

According to an embodiment of the present disclosure, the system and method includes:
  single operator controls multiple heterogeneous UMS working on multiple simultaneous heterogeneous objectives, some of which may require close collaboration;
  intelligence in task performance is divided between the operator and the UMS, with the ability to adjust the level of autonomy in response to varying platform capabilities and operational conditions;
  the operator is in close control of operations at all times by providing control directives based on mission needs and outcomes (e.g. get a camera on target) rather than specific UMS actions (e.g. drive northeast 10 m and turn to face southeast); the operator can also take over teleoperative control at any time;
  the control architecture is layered and modular to take advantage of available platform-level autonomy;

operations are integrated with a real-time modeling and simulation engine to enable a unified and intuitive representation of the battlespace for operator situational awareness including a 3D model view plus sensor feeds (e.g. camera views) from the UMS in real time;

the goal is for system performance to exceed that of non-collaborating UMS with a similar level of machine intelligence, e.g. by combining information from diverse sensor modalities and perspectives.

The disclosure provides an architecture for the handling of shared data and the creation of modular control layers, a set of user tools for interfacing to the system, and optimization algorithms that implement desired collaborative behaviors.

FIG. 1 illustrates an embodiment of a system for heterogeneous UMS control 100. The system may be referred to as an Architecture for Heterogeneous UMS Control (AHUC) system. The AHUC system 100 includes agents 110, a communications network 120, an Operator Command and Control (OCC) station 130 and an operating system or operating architecture (not shown) embedded within the system. In this exemplary embodiment, the AHUC system 100 is shown with four agents, however, in another embodiment; the AHUC system 100 may include one or more agents 110. Control includes a mix of centralized and distributed elements according to an embodiment of the disclosure. Communication can be fully centralized or partially distributed. An operator interacts with the command & control agent to influence system behavior The UMS or agents 110 are platforms that include one or more packages. The packages may include sensors, communications relay antennae, actuators or other payloads. The agents 110 may be mobile, fixed or any combination thereof. The agents 110 may be any one or combination of ground, land, air, and water operational agents. The agents 110 include one or more sensors, such as, but not limited to visual and/or infrared (IR) cameras, chemical and/or biological detectors, radiation detectors, three dimensional imaging systems, seismic sensors, acoustic sensors, radars, range finders, temperature or pressure sensors. In an embodiment, ground agents may be wheeled or tracked ground vehicles having one or more sensors. In an embodiment, aerial agents may be balloon, rotor or fixed wing aircraft having one or more sensors. In an embodiment, fixed position agents may be fixed platforms having one or more sensors, such as, but not limited to cameras and biologic and chemical sensors.

The agents 110 include a distributed intelligence module 112. The distributed intelligence module 112 includes hardware and software capable of receiving and processing commands from the OCC station 130 and from other agents, and is also capable of transmitting commands, sensor output and other messages to the OCC station 130 and other agents. The commands may include commands to move the agent from one position to another position(s) and tasks to be performed at position(s). The movement command(s) may include waypoints, spatial curves to move along, spatial areas through which to move, and spatial volumes through which to move. The task command(s) may include but are not limited to gathering sensor data, manipulating or grasping objects, switching to alternative power states, positioning communications antennae to act as relays, and delivering payloads.

The distributed intelligence module 112 may include an operator interface, processor, storage, actuators and agent interface(s) and to control agent operations, such as, but not limited to movement, sensor operations, communications operations, manipulation, and payload delivery.

The communications network 120 includes communication links capable of transmitting data between the OCC station 130 and agents 110 and between agents without the OCC station. The communication links may include wireless and wired systems, such as, but not limited to fiber optic, radiofrequency, free space optical and electrically wired systems.

The data communicated between the OCC station 130 and the agents 110 may include high level task and objective information, agent state information, lists of agents and presently assigned tasking, numeric weights describing the relative importance of different system performance criteria, direct real-time actuator commands, waypoints, environment and obstacle map information, sensor data, lists and descriptions of targets, performance metrics, and threat information.

The data communicated between the agents 110 may include high level task and objective information, agent state information, lists of agents and presently assigned tasking, numeric weights describing the relative importance of different system performance criteria, waypoints, environment and obstacle map information, sensor data, lists and descriptions of targets, performance metrics, and threat information.

The OCC station 130 includes a user interface and hardware and software capable of defining and updating mission objectives and correcting agent autonomy errors. Mission objectives may include but are not limited to searching specific physical spaces, approaching particular physical locations, patrolling particular spatial curves or areas, following targets, tracking targets, escorting targets, surrounding targets, manipulating or moving objects, establishing and maintaining high-bandwidth communications relays, and deploying payloads in particular locations or near particular targets. Targets may be stationary or moving. Agent autonomy errors may include but are not limited to failure to identify obstacles or terrain problems, misinterpretation of sensor data, failure to select the simplest solution, limit cycle behavior, losing track of targets, and failure to localize properly in a global map.

The OCC station 130 includes a centralized intelligence module 132. The centralized intelligence module 132 includes hardware and software capable of processing, storing, receiving and transmitting information. The centralized intelligence module may communicate with the agents, interface with at least one human operator, make high-level assignments of agents to tasks, execute mid-level behaviors, and execute low level behaviors. The centralized intelligence module 132 may include a human-machine interface, high level assignment and control algorithms, communications hardware and software, mid-level estimation and control algorithms, and low level control algorithms.

As discussed above, the AHUC system 100 includes an operating system or operating architecture (not shown) embedded within the system. The operating architecture may be referred to as AHUC. The AHUC includes a communications architecture, a data model and a control architecture.

The operating architecture is embedded in a non-transitory machine-readable medium in communication with at least one processor, the non-transitory machine-readable medium storing instructions which, when executed by the at least one processor of a machine, causes the machine to perform operations including agent movement and sensor operation. The processor may include one or more central processing units (CPUs) and may be physically installed in computing platforms such as but not limited to netbooks, personal computers PCs), embedded computers with the PC/104 form factor and bus, or industrial computers using the CompactPCI Express bus, and using instruction set architectures including but not limited to x86, x86-64, Alf and Vegard's RISC (AVR), or Acorn RISC Machine (ARM), where RISC is for Reduced Instruction Set Computing. The non-transitory machine-readable mediums may include one or more such as, but not limited to RAM, ROM, hard drives, and solid state memory.

The communications architecture includes a means of sending information between processes within a single platform between platforms connected wirelessly or wired together. The communications architecture may include one or more communications buses. The communications architecture may include one or more radios including but not limited to Ethernet radios, Zigbee radios, or military radios.

In an embodiment, the communication architecture may use multi-platform coordination over a lossy wireless network incorporating User Datagram Protocol (UDP) broadcast for inter-platform communications. This allows messages to be dropped and for multiple receivers to listen to the same transmission, both reducing wireless network congestion. In this configuration, different topics may be broadcast on different pre-specified ports. Anyone interested in topic X could listen on port X. Google Protocol Buffers middleware was chosen as a simple way to serialize/deserialize the messages being sent. The data model was defined in the Google Protocol Buffer space and was then translated to/from Robot Operating System (ROS) messages by a client process running on each platform. In another embodiment, a ZeroMQ publish/subscribe multicast connection may be used to serialize/deserialize and send messages over the publish/subscribe network. In a third embodiment, Data Distribution Service for Real-Time Systems (DDS) may be used to serialize/deserialize and send messages over the publish/subscribe network. The communication architecture may be implemented in many different protocols or middlewares, though it is critical that individual agents be able to access a customized subset of the system messages, that data be economized, that communication latencies are minimized, and that the protocol be tolerant to disruptions.

The control architecture includes/provides an organized collection of control segments that each execute predetermined functions that together provide control over a collection of agents. The control segments may be control algorithms implemented in software or in electrical circuitry. The control architecture defines a set of inputs and a set of outputs for each control segment and provides a framework in which information flows between the control segments.

Figure 2:
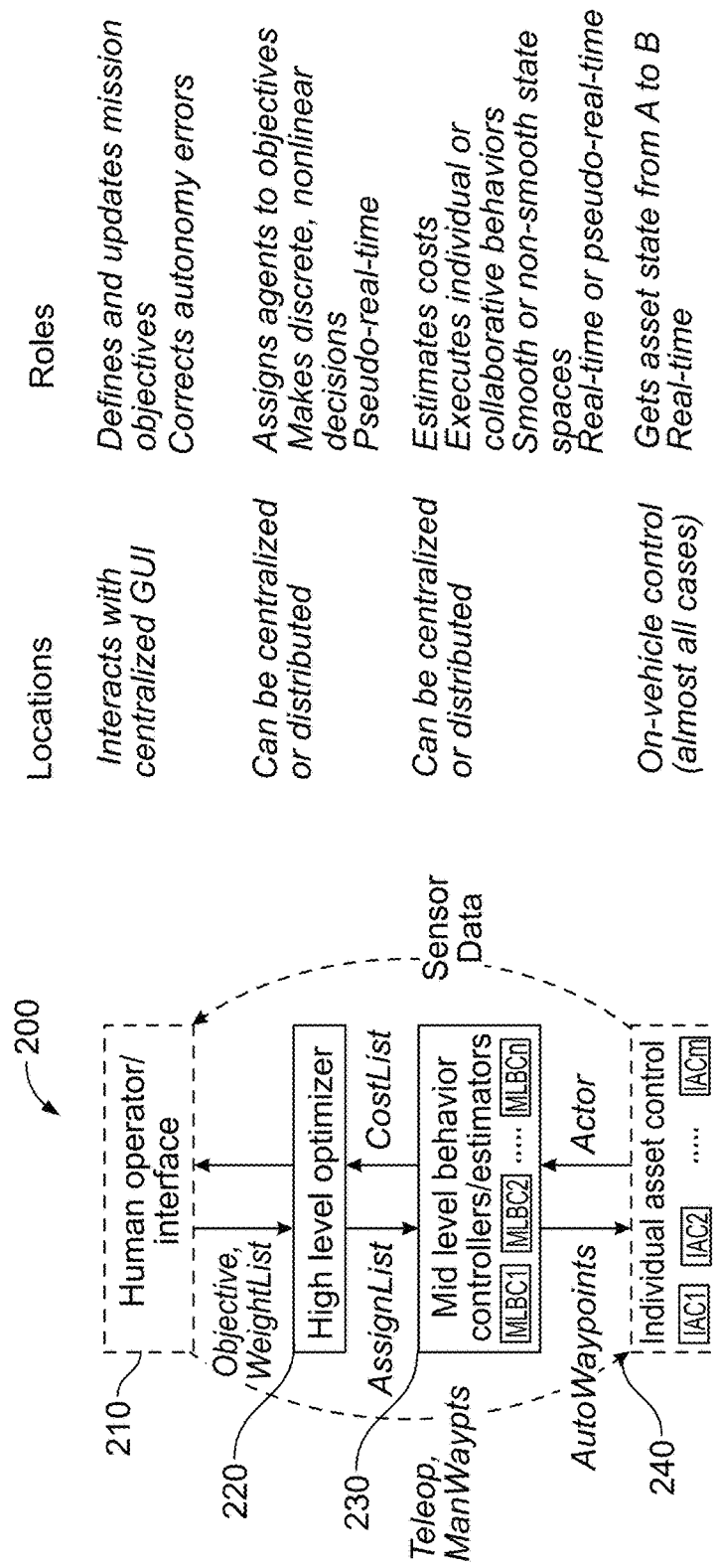
FIG. 2 is a flow chart illustrating a high-level view of system control layers according to an embodiment of the disclosure.

FIG. 2 illustrates an embodiment of a control architecture 200 according to the present disclosure. As can be seen in FIG. 2, the control architecture 200 includes layered control functions including a human operator/interface control 210, a high level optimizer (HLO) 220, mid-level behavior controllers/estimators (MLBCs 230), and individual asset/agent control 240. FIG. 2 also shows some exemplary locations and roles of the layered control functions.

At human operator/interface control 210, one or more human operators interacts with a user interface, producing desired behaviors by constructing and manipulating certain command and control messages. The control architecture 200 is structured to allow the operator(s) to efficiently provide the functions that are the most challenging to automate reliably, including tactical command and high-level perception. For example, the operator may create and continually update a series of Objective Messages, which lists and prioritizes the outcomes presently desired, in response to data describing system performance as well as live sensor feeds from the vehicles. The operator may also manipulate a WeightList message, which alters the way in which behaviors are executed, e.g. to minimize energy consumption, to minimize completion time, or to maximize likelihood of success.

The human operator/interface control 210 includes an interface for inputting command objectives into the control architecture 200 and a processor for translating the inputs from the interface device into a set of messages defined by the data model. The interface may be, but is not limited to one or more input devices, such as, but not limited to keypads, keyboards, gamepads, tablets, joysticks, microphones, and touchscreen monitors. The processor may include, but is not limited to one or more core processing units and memory, such as, but not limited to PC processors, embedded processors, microcontrollers, field programmable gate arrays, digital signal processing chipsets, PC/104 processors, and mobile device processors. The human operator/interface control 210 may be located at a single position or location, or may be distributed to one or more positions or locations. For example, in one embodiment, the interface and processor may be co-located. In another embodiment, the interface and processor may be located at different locations.

At individual asset/agent control 240, individual assets are autonomously controlled to operate the asset to contribute to the accomplishment of one or more tasks described in the Objective Message. Individual asset/agent control 240 will most often reside on individual agents. In other embodiments, some controls may reside in mid or high level control. For example, vehicle specific autonomy may move a UMS from a current state or position to a desired state or position. This might include GPS navigation, path planning, obstacle avoidance, onboard sense and avoid, GPS denied navigation such as simultaneous localization and mapping, and other simple behaviors. The UMS controller receives a target state (described in AutonomousWaypoint or ManualWaypoint messages) and returns its actual state (described by an Actor message) while working to minimize the difference between the two. In an embodiment, this control may be performed by a controller onboard a vehicle, and/or certain functions may be provided by a surrogate, e.g. a fixed ground station or even a process running on another agent.

Individual asset/agent control 240 may provide sensor data directly to the human operator/interface 210 or to intelligence units on other agents or on a centralized intelligence unit. Individual agent control 240 may receive teleoperative commands and/or waypoint commands directly from the human operator/interface 210 or may receive these commands from HLO 220 and/or MLBCs 230.

The control architecture 200 further includes the HLO 220 and the mid-level controller/estimator 230 that optimize the multi-UMS system's effectiveness in achieving the behaviors described by Objective and modified by WeightList. Collectively these layers receive the HeightMap, Actor, Objective and WeightList messages as inputs and issue target states (AutonomousWaypoint messages) for each UMS as outputs.

The HLO 220 assigns agents to objectives, based on cost estimates. The HLO 220 takes CostList messages as an input and produces AssignmentList as its output. The HLO 220 may be centralized, reside or be located, with the human operator/interface 210) or may be distributed, reside or be located, across the individual UMS agents 110 (FIG. 1), or may be distributed between the human operator/interface 210 and the individual UMS agents 110 (FIG. 1). The HLO 220 is located on a HLO module on a processor in the system 100 (FIG. 1).

MLBCs 230 include both estimation and control elements. The estimators generate CostList messages based on the Objective list, Actor information, and environmental model information (e.g. HeightMap) as well as models of vehicle capabilities. These estimation elements continually run online for all feasible assignment combinations of vehicles to objectives, updating cost information supplied to the HLO, which might change assignments at any time. The controllers execute the behaviors assigned to vehicles by the AssignmentList, and generate AutonomousWaypoint data to direct lower level action. The control elements need only run for currently assigned combinations of agents and objectives, though in some cases they could also run in the background. The MLBCs 230 are located on an MLBC module on a processor in the system 100 (FIG. 1).

As discussed above, the HLO 220 and MLBCs 230 may be implemented centrally at a base station, or distributed across the UMS agents 110 (FIG. 1). The HLO and MLBCs are highly modular and thus can be easily updated as improved algorithms emerge. Layering allows hybridization of control by different methods, e.g. using computationally efficient swarm algorithms for low-level collaboration while managing overall mission performance with a nonlinear optimization method. While the definition of the interfaces between these layers remains fixed, capability may in principle be shifted between layers. For instance, if an UMS agent does not have an onboard obstacle avoidance capability, then this can be handled by an offboard MLBC, and incorporated into the generation of AutonomousWaypoint messages to form an obstacle-avoiding path.

Alternatively, an operator can bypass various layers of control by directly specifying the AssignmentList, ManualWaypoint, or Teleoperation messages through the centralized user interface. These messages are passed directly through to the appropriate one or more agent. Direct input of the AssignmentList into the centralized user interface bypasses the high level optimizer and forces assignment of agents to objectives. These messages are passed to the agents. Direct input of ManualWaypoint bypasses the high level optimizer and the mid-level behavior controllers, controlling individual vehicles with waypoints. The Teleoperation message bypasses the intermediate layers and most of the lower-level UMS control, allowing the operator to remotely drive the vehicle over the network. These options may be used to create a "sliding" or variable level of autonomy.

The data model contains message types to facilitate multi-agent operator-directed command and control. According to an embodiment of the disclosure, the data model may be expandable and include multiple message types. For example, the data model may include 12 different message types. Some of these include obvious analogs in any autonomy architecture (e.g. the Actor messages which contain information about agent state), but others specifically facilitate distributed task assignment and collaborative execution. The set includes messages related to the system and operating environment state, messages that allow the operator to control the system at lower levels, a set of messages to enable high-level control of the integrated system, and several examples of mission- or behavior-specific messages. These messages might be passed among different system agents or within individual agents.

The Actor, OccupancyMap, and HeightMap messages concern the state of the system and its operating environment. The Actor messages contain information about the location, pose and state of the various actors. This includes the UMS agents as well as other actors including targets being tracked, potential hostile agents, and unknown moving participants. Agents generally publish their own Actor messages, but may also publish Actor messages for other entities such as moving targets or even estimates of the state of other agents. The OccupancyMap messages report obstacles close to platforms for short-term obstacle avoidance. The HeightMap messages report global terrain information and obstacles for shared model building and long-term path planning.

The Teleoperation and ManualWaypoint messages allow the operator to reach down to lower levels of control to direct individual system agents. These messages are generally created by the operator through the user interface. The Teleoperation messages allow the operator to manually teleoperate each platform. The ManualWaypoint messages allow the operator to manually force waypoints for individual platforms.

The Objective, CostList, WeightList, AssignmentList, and AutonomousWaypoint messages compose the basic message set required to implement a wide variety of high-level command and control functions. The Objective messages detail high-level command-intent-driven objectives for the network of platforms to accomplish, and can include prioritization among objectives as well as the ability to temporarily suspend and then re-activate objectives. These messages are generally generated and modified by the operator through the user interface, though they might be modified by other control elements (e.g. to mark them complete or provide status). The CostList messages are produced by each platform estimating how much it would cost to execute each feasible Objective. The costs in the CostList messages are weighted combinations of multiple metrics estimated by each platform (e.g. time to arrival, cycle time, energy to arrival, cycle energy, probability of failure before arrival). The WeightList messages allow the operator to tune the relative importance of the metrics during execution. For example, the user can change from an energy efficient network behavior to an as soon as possible network behavior if the situation dictates. System behavior is altered by changing the way the CostList messages are calculated, which impacts which agents are assigned to which objectives, and by changing the priorities of mid-level controllers that execute the behaviors. The AssignmentList messages describe which agents are assigned to which objectives. The AutonomousWaypoint messages describe the planned paths for the agents to accomplish their assigned objectives.

The AttentionList and ViewshedMap messages are examples of mission- or behavior-specific message types that can be added as needed. The ViewshedMap messages describe the portion of the battlespace where agents can currently sense (e.g. incorporating vehicle state, pose and 3D map information), which can be used for heterogeneous swarm behaviors or other collaborative behaviors that require sensing. The AttentionList messages describe a time-variant weighting of the importance of the objectives relative to each other. These weights may be generated by basis functions that reset when an objective is visited, providing a computationally efficient means of creating emergent cyclic behavior for cases when the agents are unable to complete all objectives simultaneously. While this set of messages must undoubtedly be expanded to complete many mission types, it is designed to provide a broad and flexible capability to enable collaborative missions across a wide range of timescales and behavior types.

In an embodiment, the data model may be defined within a communications middleware, such as, but not limited to Google Protocol Buffers, which provides a way to serialize/deserialize on multiple operating systems using multiple languages (for example: C++, C, C#, on Linux and Windows).

Agents 110 (FIG. 1) use an onboard control architecture, which may be referred to as low-level control, for intra-platform communication. Low-level control may be selected from architectures that provide autonomy at various levels. Low-level control is the traditional waypoint control or path/trajectory tracking control. A specific example of an onboard control architecture is the Robot Operating System (ROS). ROS includes publish/subscribe middleware. It also has an integrated build system, file structure, utility programs, and large repository of open source code. The integrated package and available source code made it easy to leverage existing ROS developments such as sensor drivers (e.g. Hokuyo LIDARs) and obstacle avoidance.

As discussed above, the system architecture contains multiple hierarchical levels of control: low, mid, high. System architecture mid-level control includes the HLO and the MLBC. The HLO and MLBC may be centralized or distributed. In this disclosure, the term "centralized" means located at the human operator (user)/interface position or at a location not co-located but addressable by the user and not located with an agent(s). For example, the user may address an interface that is in communication with a co-located processor or a processor located away from the interface but not located with the agent(s). Additionally in this disclosure, the term "distributed" means located at or with or in proximity to an agent(s). For example, a fixed platform with a sensor mounted on a rooftop may include a processor and transmitter located within the building.

In an embodiment, the computational resources available on the platform may include obstacle avoidance and advanced path planning. The system architecture does not specify or constrain what algorithms are used within low-level control; it allows anything including but not limited to Proportional-Integral-Derivative Controllers, Model-Predictive Controllers, and Rapidly-expanding Random Trees. The input waypoints are typically generated by the mid-level control, but the ManualWaypoint messages enable the user interface to force a specific desired waypoint at any moment. The mid-level control is based on a domain specific set of behaviors (e.g. move to point, search area, patrol border, protect asset, follow target) and might apply to individual vehicles or teams (e.g. swarms). The mid-level controller takes in the assigned objective, selects the correct behavioral algorithm and produces waypoints for the low-level controller. The objectives and assignment lists are received from the high-level control, but the UI has the ability to force assignments as well. The mid-level controller is complemented by a mid-level cost estimator. Each platform runs a mid-level cost estimator to produce a CostList message containing a cost estimate for all objectives. Again, the fidelity of the estimate is not constrained within the system architecture. Computationally limited platforms can use very coarse heuristic estimates of the metrics used to compute the cost.

Computationally rich platforms can use detailed predictive simulations to give more accurate estimates. The idea is to allow each platform to estimate the cost rapidly so that it can respond rapidly to a changing environment or set of objectives. The high-level control takes in the list of objectives, the list of platforms, and the cost lists and produces assignments. Mid-level and high-level controllers may be fully distributed among agents, fully centralized and co-located with the other systems, or partially centralized and partially distributed.

Algorithms used in the system architecture may be coded in a variety of environments because standardization is at the communications layer. Low-level controllers may be implemented in ROS. In some cases these may be manually coded, while in others advanced ROS code has been used (e.g. for obstacle avoidance). Mid-level controllers may be coded in ROS when located onboard vehicle agents, and in a computation platform, for example Matlab, when centralized and co-located with the user interface (UI). The high level control is a distributed algorithm presently implemented centrally in Matlab.

Figure 3:
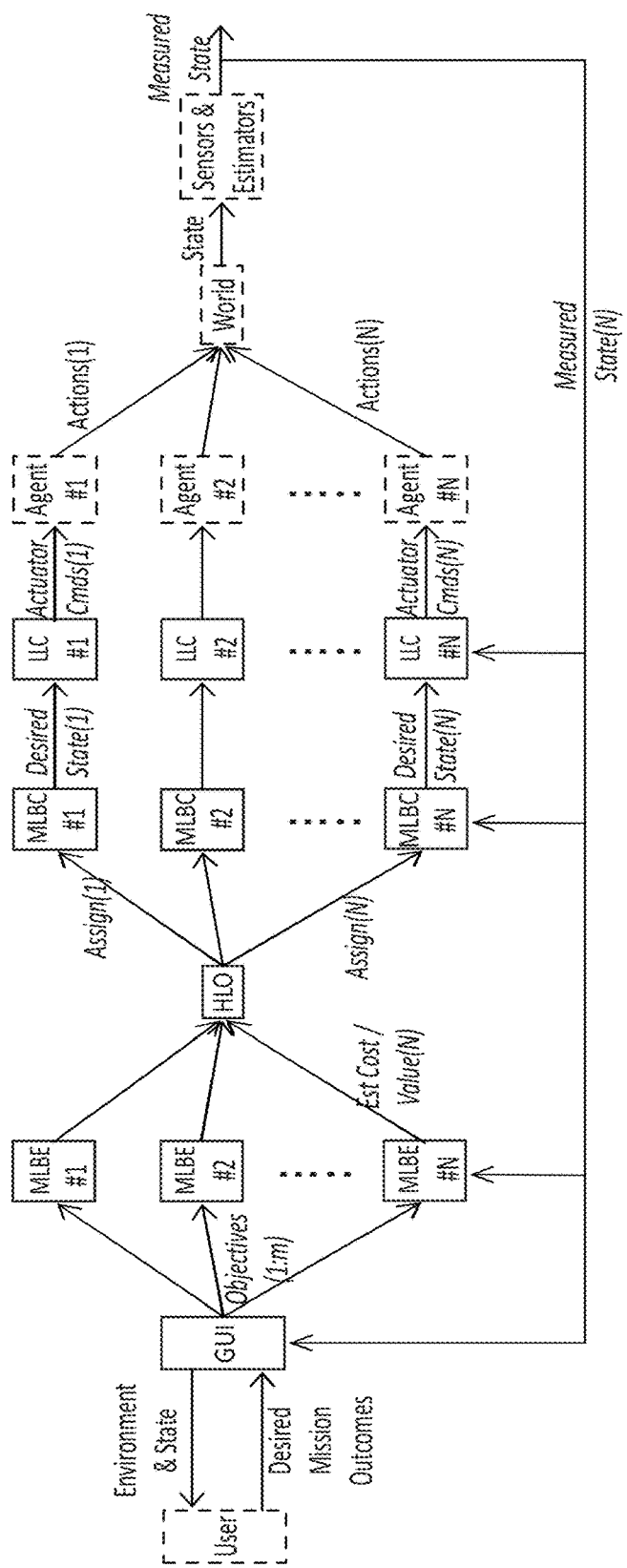
FIG. 3 is a flow chart illustrating a view of system control layers according to an embodiment of the disclosure.

FIG. 3 is a flow chart illustrating a process flow for a control architecture according to the embodiment shown in FIG. 2. As can be seen in FIG. 3, the control architecture includes multiple layer control functions. How the control functions are distributed is not specified in this embodiment. The control architecture includes an interface tool or user interface that receives instructions from a user and provides environment and state data to the user. In an embodiment, the user interface may be, but is not limited to a graphical user interface (GUI), typing, speech-to-text processing, gesture based control, or other know interface device or system.

The Mid-Level Behavior Estimator (MLBE) generates predictions of the cost for each agent to perform each objective in the system. Cost measures performance in terms of a wide variety of metrics including but not limited to time to completion, energy consumed, and likelihood of success. Cost may include weighted combinations of multiple performance metrics.

The Mid-Level Behavior Control (MLBC) executes behaviors that have been assigned to particular agents or sets of agents. The MLBC generates desired states versus time for the low level controllers to achieve mid-level objectives.

The Low Level Controller (LLC) executes control over an agent to move it from the current state (e.g. location, pose, mode of operation) to a desired state.

Figure 4:
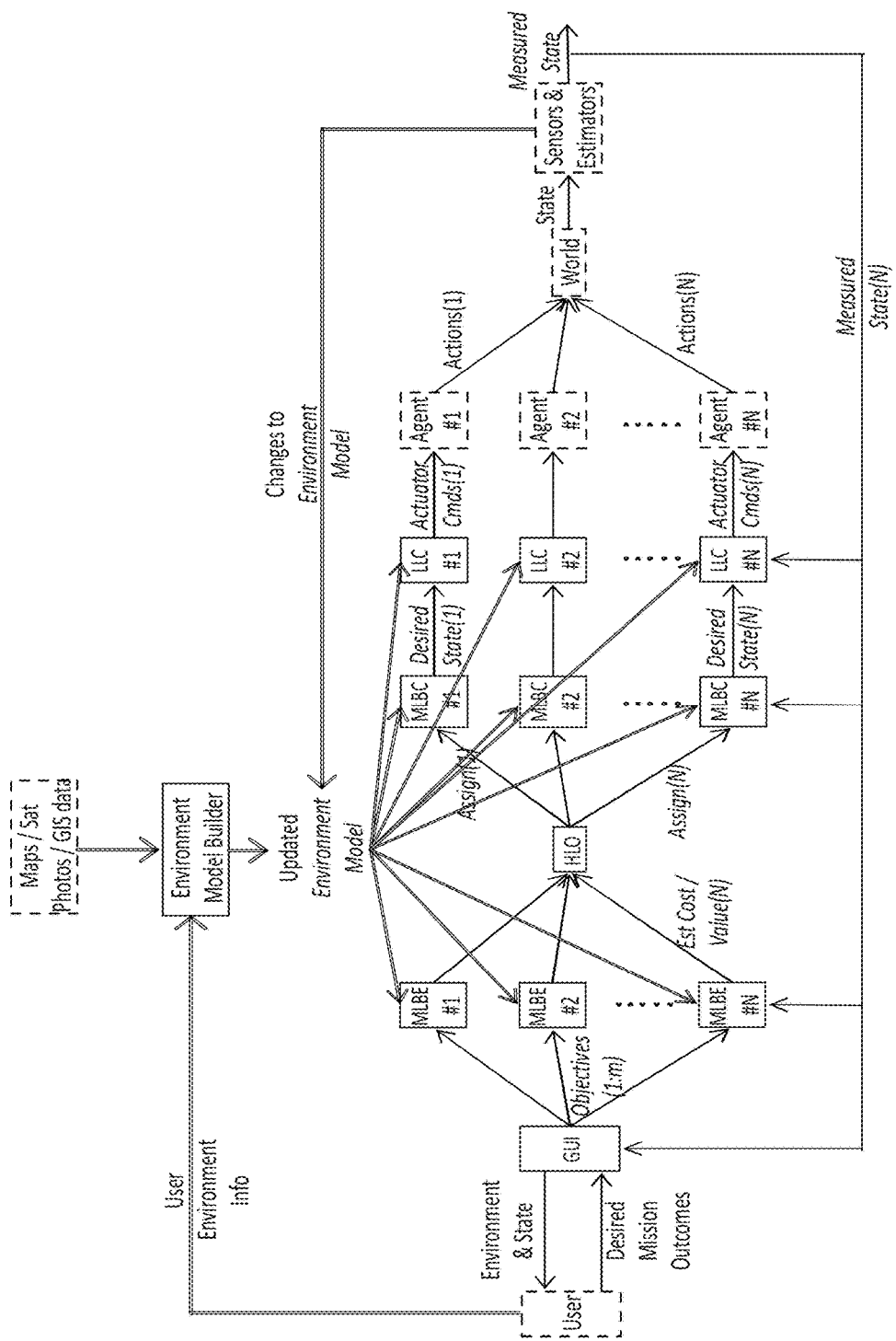
FIG. 4 is a flow chart illustrating another view of system control layers according to an embodiment of the disclosure.

FIG. 4 is another flow chart illustrating a process flow for a control architecture according to an embodiment of the disclosure. In this exemplary embodiment, the process flow reflects when a model of the operating environment is shared among agents and control segments. A model of the environment is stored within each MLBE, HLO, MLBC, and LLC. This model is created by the user and from existing data such as maps, satellite photos or Geographic Information Systems (GIS) data, and may be updated based on sensor information gathered by the agents.

Figure 5:
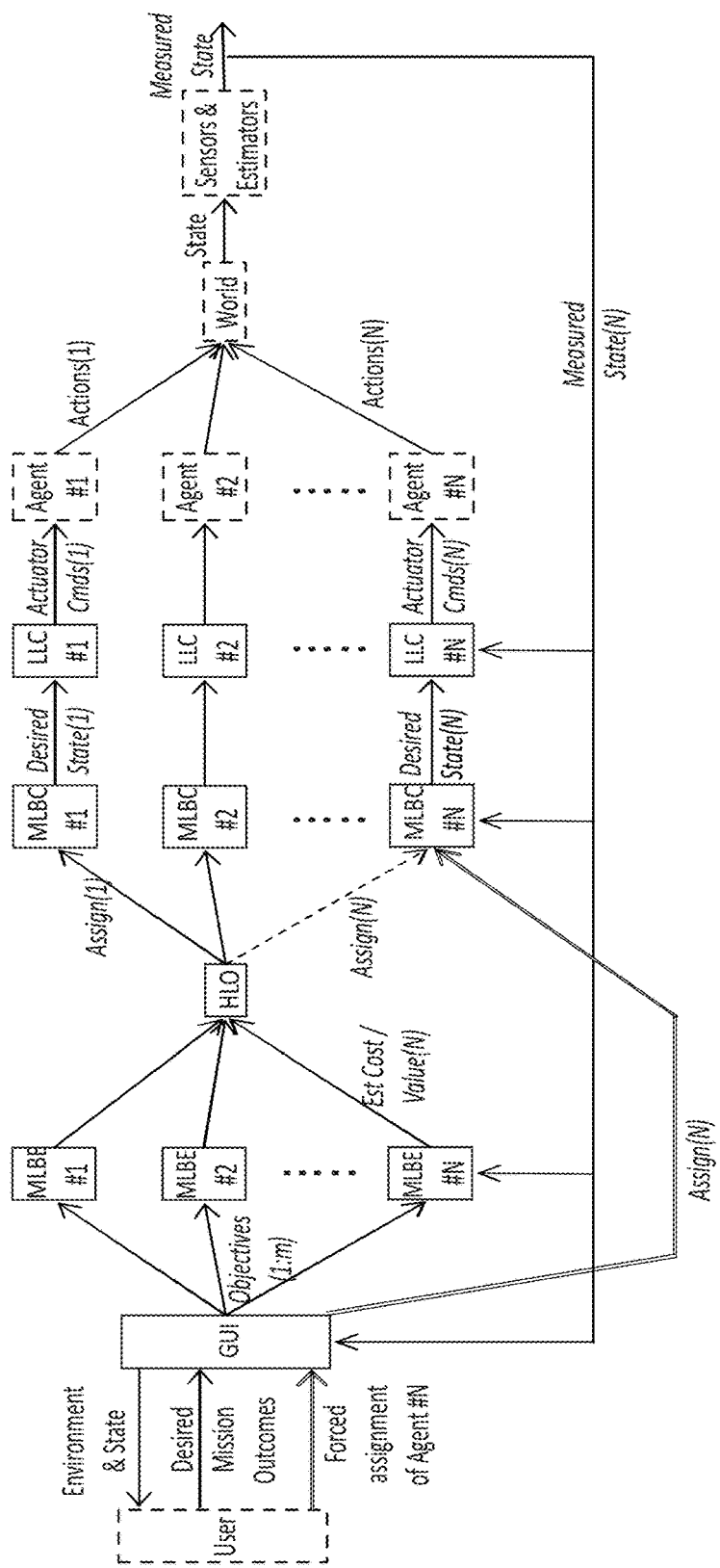
FIG. 5 is a flow chart illustrating another view of system control layers according to an embodiment of the disclosure.

FIG. 5 is another flow chart illustrating a process flow for a control architecture according to an embodiment of the disclosure. In this exemplary embodiment, the process flow reflects when the user forces the assignment of one agent (agent #N) to a particular objective. The MLBE for that agent is bypassed and the HLO output for that agent is ignored as direct user input replaces the outputs of these control segments. The MLBC and LLC for agent #N operate the same as in the previous embodiment.

Figure 6:
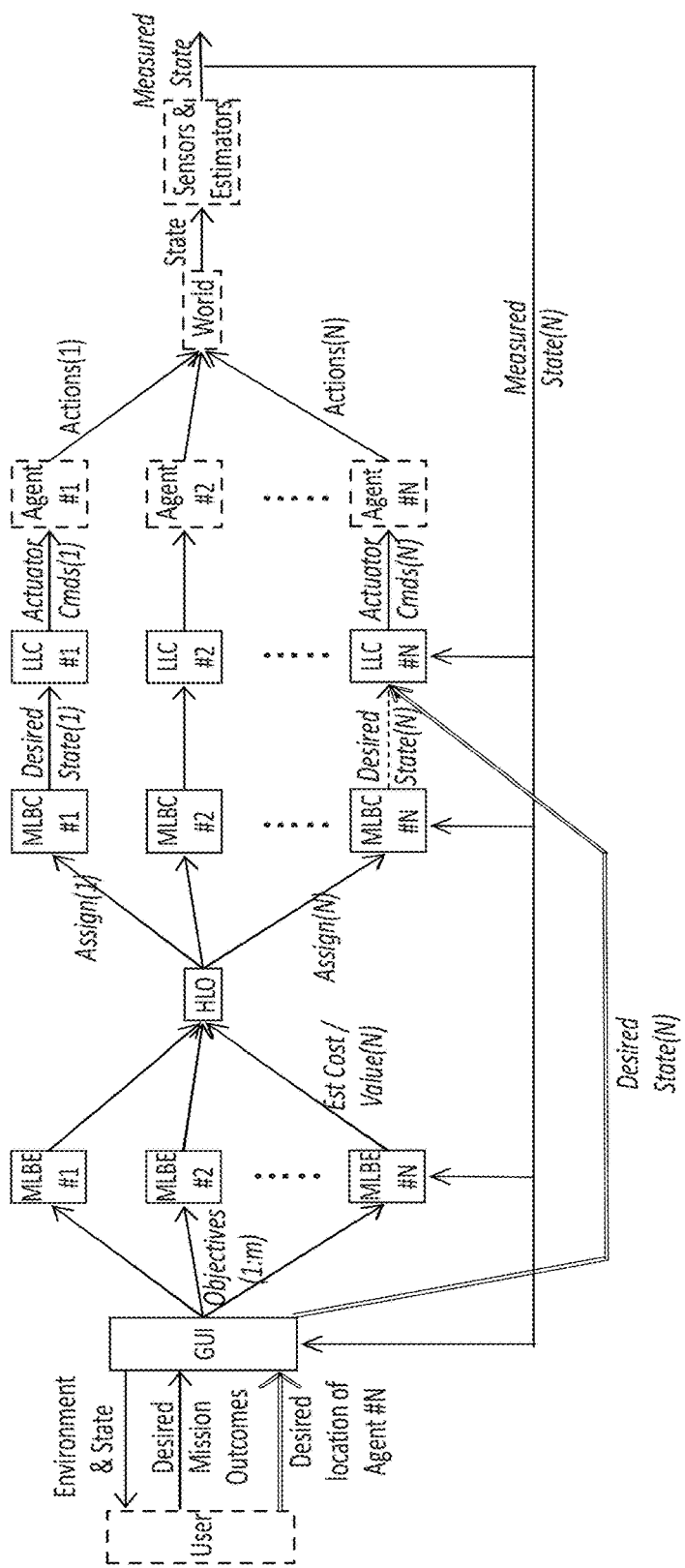
FIG. 6 is a flow chart illustrating another view of system control layers according to an embodiment of the disclosure.

FIG. 6 is another flow chart illustrating a process flow for a control architecture according to an embodiment of the disclosure. In this exemplary embodiment, the process flow reflects when the user forces assignment of desired states (e.g. waypoint locations) to one agent (agent #N). The MLBE and MLBC for that agent are bypassed as direct user input replaces the outputs of these control segments. The LLC for agent #N operates the same as in the previous embodiment.

Figure 7:
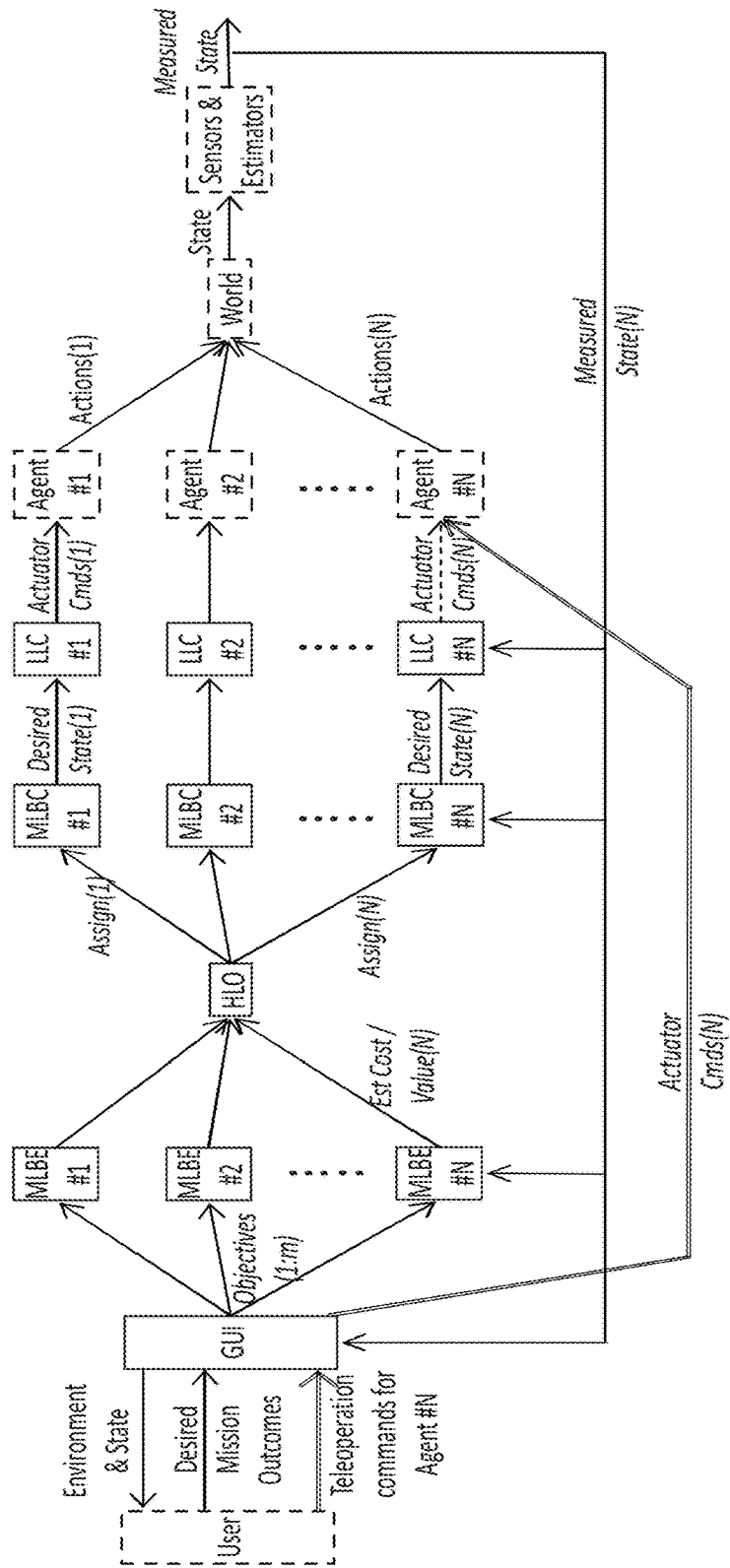
FIG. 7 is a flow chart illustrating another view of system control layers according to an embodiment of the disclosure.

FIG. 7 is another flow chart illustrating a process flow for a control architecture according to an embodiment of the disclosure. In this exemplary embodiment, the process flow reflects when the user teleoperates one agent (agent #N). The MLBE, MLBC and LLC for that agent are bypassed as direct user input replaces the outputs of these control segments.

Figure 8:
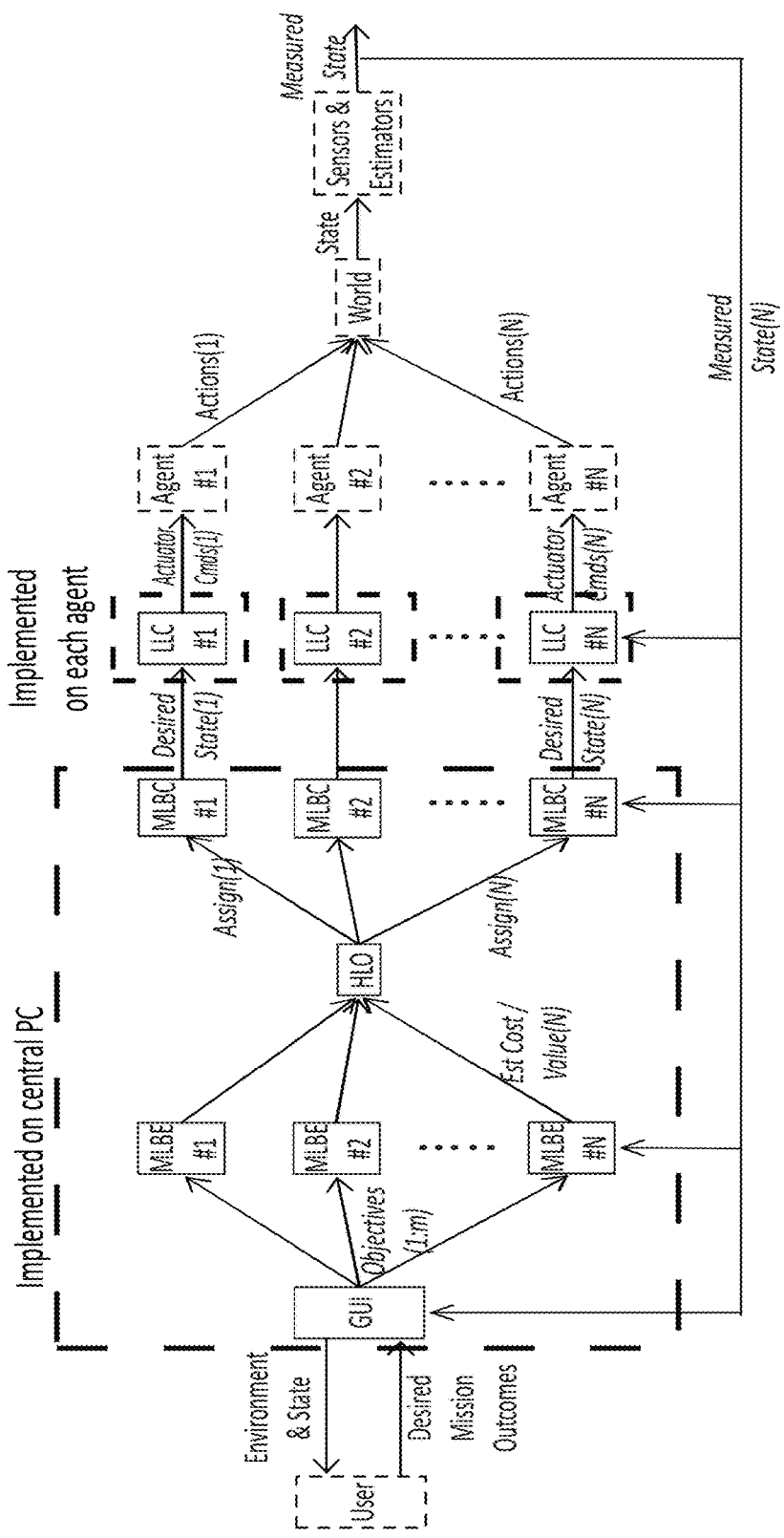
FIG. 8 is a flow chart illustrating another view of system control layers according to an embodiment of the disclosure.

FIG. 8 is another flow chart illustrating a process flow for a control architecture according to an embodiment of the disclosure. In this exemplary embodiment, the process flow reflects the physical locations of the control segments for an embodiment wherein the mid-level and high level control is centralized. The HLO, the MLBEs and MLBCs for all agents, and the user interface are co-located on a single central processor. The LLCs are implemented on processors attached to or in close proximity to each agent.

Figure 9:
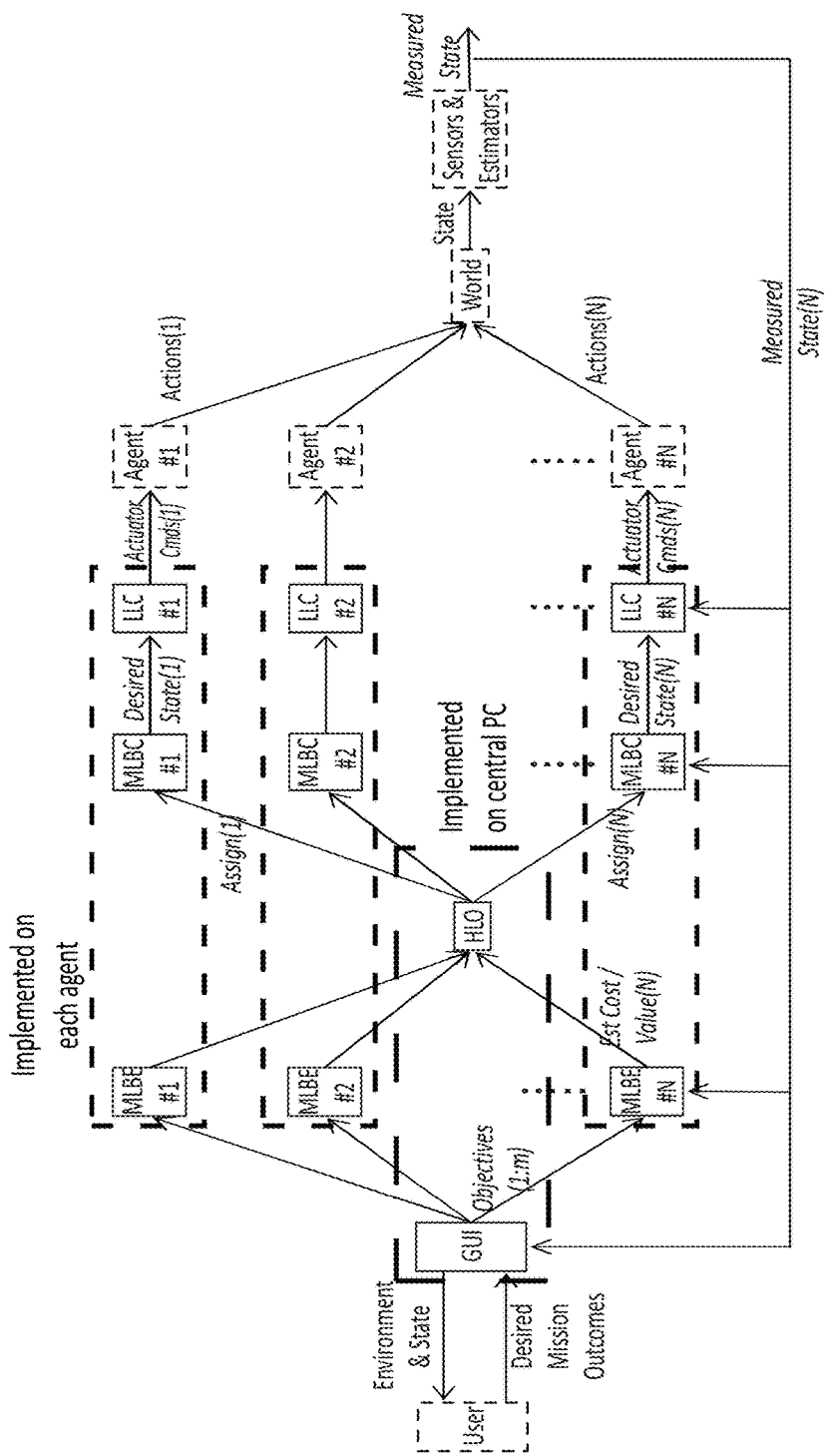
FIG. 9 is a flow chart illustrating another view of system control layers according to an embodiment of the disclosure.

FIG. 9 is another flow chart illustrating a process flow for a control architecture according to an embodiment of the disclosure. In this exemplary embodiment, the process flow reflects the physical locations of the control segments for an embodiment wherein the high level control is centralized and the mid-level control is distributed. The HLO and the user interface are co-located on a single central processor. The MLBE, MLBC and LLC for each agent are co-located on processors attached to or in close proximity to each agent.

Figure 10:
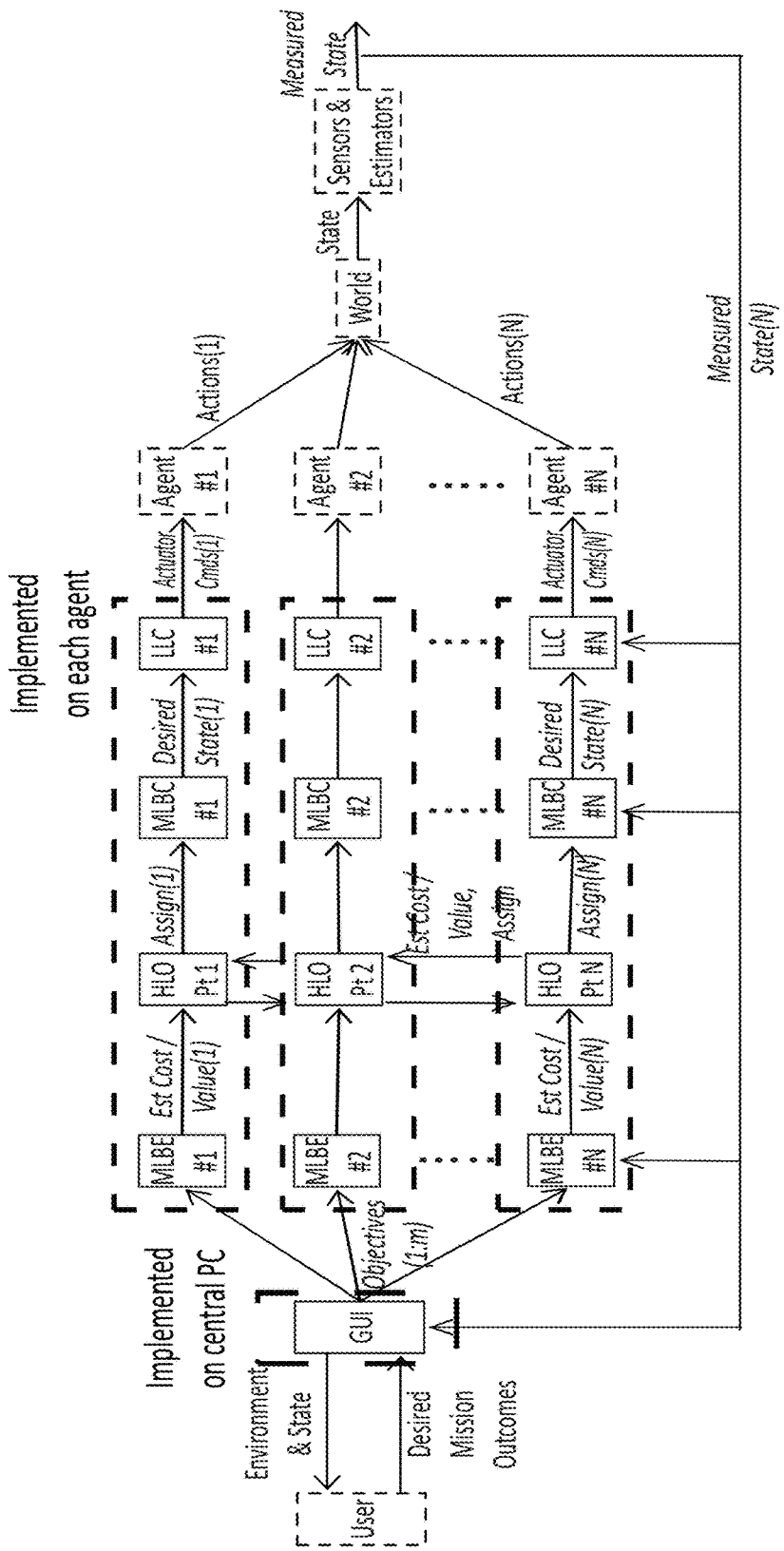
FIG. 10 is a flow chart illustrating another view of system control layers according to an embodiment of the disclosure.

FIG. 10 is another flow chart illustrating a process flow for a control architecture according to an embodiment of the disclosure. In this exemplary embodiment, the process flow reflects the physical locations of the control segments for an embodiment wherein all control segments are distributed. The MLBE, MLBC, and LLC for each agent are co-located on processors attached to or in close proximity to each agent. The HLO is a distributed algorithm that runs across the processors attached to or in close proximity to each agent.

Figure 11:
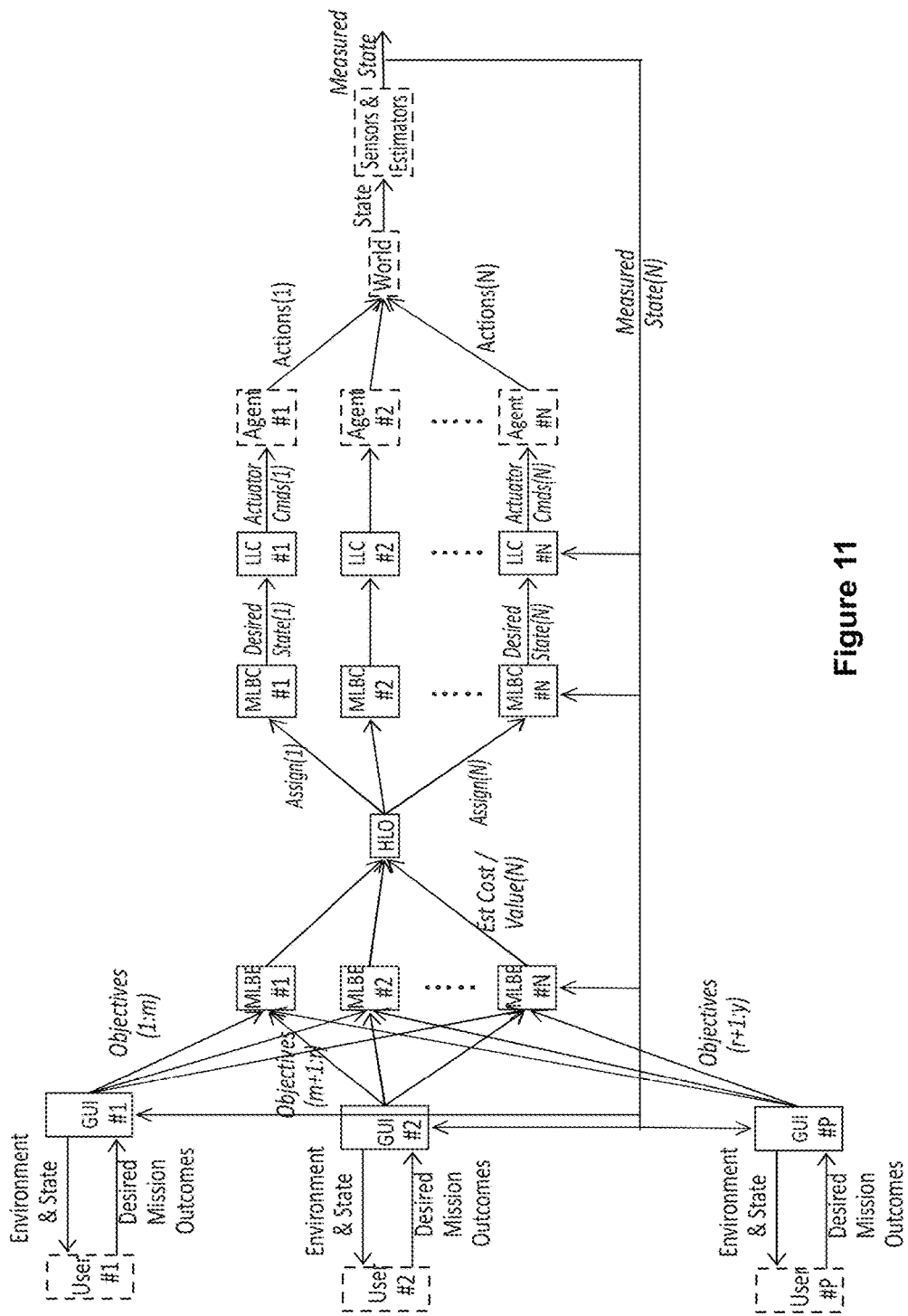
FIG. 11 is a flow chart illustrating another view of system control layers according to an embodiment of the disclosure.

FIG. 11 is another flow chart illustrating a process flow for a control architecture according to an embodiment of the disclosure. In this exemplary embodiment, the process flow reflects when multiple human users interface with multiple user interfaces to create objectives to task the system. The MLBEs, MLBCs and HLO receive and aggregate the objectives from all users. The MLBEs, MLBCs, HLO, and LLCs operate the same regardless of the number of human users providing objectives to the system.

The relationship between the AHUC system and low level control is discussed as follows, as exemplified by ROS. ROS complements AHUC by providing integrated and open on-vehicle or agent autonomy capabilities. In an embodiment, a AHUC may use ROS at a vehicle/agent level, using ROS's standard message types including message equivalents for platform state, teleoperation, waypoints, and maps. However, none of the messages or algorithms required for the mid-level and high-level control exists within ROS. In an embodiment, a Data Distribution Service (DDS) middleware may be used as middleware.

The HLO is responsible for assigning agents to objectives; its primary output is the AssignmentList message. In an embodiment, objectives may be handed off from agent to agent. The algorithm is distributable but may be implemented centrally, running on a computational platform, such as Matlab. The software may be on a machine co-located with the operator and user interface. In another embodiment, the software may be located on a processor located on an agent. In another embodiment, the algorithms may be executed by fully distributed software running on distributed processors on more than one agent.

The HLO minimizes the assignment cost J defined by:

$$J = \sum_i^{N_A} \sum_j^{N_O} z_{ij} \hat{C}(A_i, O_j) \qquad (1)$$

Where $N_A$ and $N_O$ are the number of agents and objectives, respectively, $\hat{C}(A_i, O_j)$ represents the estimated cost of the $i^{th}$ agent completing the $j^{th}$ objective, and $z_{ij}$ are a set of assignment variables valued between zero and one that dictate the extent to which the $i^{th}$ agent is assigned to the $j^{th}$ objective. Thus the HLO problem solves for the set of assignment variables z that minimizes J, subject to certain constraints. In implementations to date, $z_{ij}$ are binary variables (zero or one); however they could be real-valued between zero and one for alternative optimization methods and for implementations where multiple agents are assigned to a single objective.

The most straightforward solutions to minimize equation (1) make 1:1 assignments of agents to objectives. That is, each agent is assigned to at most one objective, and one objective has at most one agent assigned to it. In this case, the constraints on equation (1) are as follows:

$$\sum_i^{N_A} z_{ij} \leq 1 \, \forall \, j \qquad 1)$$

(each objective is assigned to at most one agent)

$$\sum_j^{N_O} z_{ij} \leq 1 \, \forall \, j \qquad 2)$$

(each agent is assigned to at most one objective)

$$\sum_i^{N_A} \sum_j^{N_O} z_{ij} = \min(N_A, N_O) \qquad 3)$$

(force as many assignments as the lesser of the number of agents and the number of objectives)

Herein, a solution to the problem of selecting discrete valued $z_{ij} \in \{0,1\}$ is attained through relaxation of the decision variable z and application of conventional linear programming methods (i.e. relaxed linear program) subject to the constraint $z_{ij} \in [0,1]$ and the constraints (1)-(3) above. Special cases exist wherein the solution to the relaxed problem is the solution to the general discrete valued problem in general, but these cases do not apply here. However, in practice, it is observed that as long as the sensitivity of J with respect to each $z_{ij}$ is nonzero, $z_{ij}$ tends to be driven to the constraint limits 0 or 1, providing the desired assignments.

Figure 12:
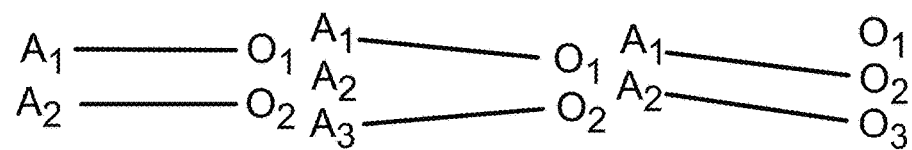
FIG. 12 illustrates a 1:1 assignment of agents to objectives when $N_A=N_O$, $N_A>N_O$, and $N_A<N_O$ according to an embodiment of the disclosure.

FIG. 12 illustrates a 1:1 assignment of agents to objectives when $N_A = N_A > N_O$, and $N_A < N_O$. This 1:1 assignment has been implemented for arbitrary $N_A$ and $N_O$. If $N_A = N_O$, then each agent is assigned to an objective and each objective has an agent assigned to it. If $N_A > N_O$, then $N_O$ assignments are made and the remaining agents remain idle. If $N_A<N_O$, then $N_A$ assignments are made and some objectives are unassigned. In all cases, the assignments may change in time, for example if an unassigned objective increases in importance or if the system state makes changes such that a lower-cost solution exists when assignments are made.

In order to prevent the HLO from suffering "decision chatter," i.e. excessive switching or oscillation between assignments, a switching cost may be assigned to changing from the current assignment. This switching cost provides some resistance to changing the assignment and is also called "hysteresis."

In the future it will be desirable to be able to assign multiple agents to a single objective, which would allow the formation of ad hoc teams on the fly to perform tasks such as swarm tasks or enable backup agents to provide redundancy for high-priority tasks. Similarly, it may also be desirable to assign multiple objectives to a single agent simultaneously, as multi-functional vehicles may be able to perform more than one task at the same time (e.g. watching a target while jamming a source). In these cases, the constraints applied to equation (1) are different.

If multiple agents are allowed to be assigned to a single objective (ad hoc teaming), constraint 1) must be replaced with:

$$\sum_{i}^{N_A} z_{ij} \leq maxteamsize(O_j) \qquad \text{1a)}$$

and constraint 3 must be replaced with $$\sum_{i}^{N_A}\sum_{j}^{N_O} z_{ij} = \min\left(N_A, \sum_{j}^{N_O} maxteamsize(O_j)\right) \qquad \text{3a)}$$

where maxteamsize is a function that returns the maximum allowable number of agents that can be assigned to each objective. Constraint 3a limits the total number of assignments to the lesser of the number of agents or the total number permitted to be assigned by all objectives.

If ad hoc teaming is permitted and it is also permissible to assign a single agent to multiple objectives simultaneously, then constraint 2) must be replaced with:

$$\sum_{j}^{N_O} z_{ij} \leq N_O \forall i \qquad \text{2b)}$$

and constraint 3 must be replaced with $$\sum_{i}^{N_A}\sum_{j}^{N_O} z_{ij} \leq N_A N_O \ \& \sum_{i}^{N_A}\sum_{j}^{N_O} z_{ij} \geq \min(N_A, N_O) \qquad \text{3b)}$$

Constraint 2b) states that each agent is assigned to at most all of the current objectives, and constraint 3b) states that the total number of assignments is at least the lesser of the number of agents and the number of objectives, and at most the product of the number of agents and the number of objectives.

In addition to changing the constraints, for these cases other than 1:1 assignments, the cost estimation formulation would need to be adapted in order to allow for the combination of costs or "value" added when multiple agents share a task, or to capture the extent to which costs of two objectives may be shared by an agent performing them simultaneously. These details remain to be worked out in the future.

Along with the HLO, the MLBCs form the crux of the layered collaborative control structure. MLBCs perform two primary functions: continually estimating costs associated with objective-agent assignments, and executing assigned behaviors in real time or near-real time. Behaviors and therefore MLBCs may theoretically apply to either single vehicles or multiple collaborating vehicles, and in either case may be either centrally located or distributed. An example of a single-vehicle MLBC is a controller that makes a vehicle patrol along a line. The control logic could be onboard the vehicle or centrally located (or even located on another vehicle with sufficient computational capacity). An example of a multiple-vehicle MLBC is a swarm controller that coordinates several vehicles moving in formation. In this case, the control logic could be centrally located or distributed across the several vehicles.

Objectives are generally referenced to a specific target (or set of targets), and are focused on outcomes. Each MLBC is responsible for carrying out one of these objectives. For example, if an objective states that a certain area is to be viewed by an optical camera, then the associated MLBC must operate a vehicle or set of vehicles to produce this outcome with respect to the specific target (in this case, the area).

An important function of the MLBCs is to compute estimated costs associated with each feasible assignment of objectives to agents. Cost estimates are weighted combinations of several metrics according to the following:

$$\hat{C}(A_i, O_j) = \beta_1 M_1(A_i, O_j) + \beta_1 M_1(A_i, O_j) + \ldots + \beta_n M_n(A_i, O_j) \qquad (2)$$

Equation (2) expresses the estimated cost of the ith agent ($A_i$) performing the jth objective ($O_j$). M are "metric" functions that compute specific performance metrics associated with the agent-objective pair. Metrics might include energy consumed, time to completion, or other performance elements. $\beta$ are weights, defined through the user interface, that weight the relative priority of different performance elements quantified by the different metrics. The weights $\beta$ are defined in the WeightList message.

Individual metrics may be computed with arbitrary levels of fidelity, depending on algorithms and available computation capacity. Publishing and repeatedly republishing cost estimates rapidly is important to overall system success, therefore speed of estimation is a high priority. Thus simple metrics, e.g. estimating time to arrival based on distance and estimated maximum speed over the local terrain, may be used. By contrast, if sufficient computational capacity is available, metrics may be estimated based on full predictive simulations. Metric estimates are dependent on the state as well as individual agent capabilities.

In many cases an agent may not be capable of executing an objective at all. For example, this could occur if the behavior fundamentally requires a sensor that the agent lacks, or if the behavior requires an aerial vehicle and the agent is not an aerial vehicle. In these cases, the objective is said to not be feasible for the agent, and the cost is driven to a nominal extreme value to ensure that it is not assigned.

Several examples of simple mid-level behaviors were implemented for the demonstration system. These are described in the following paragraphs.

Figure 13:
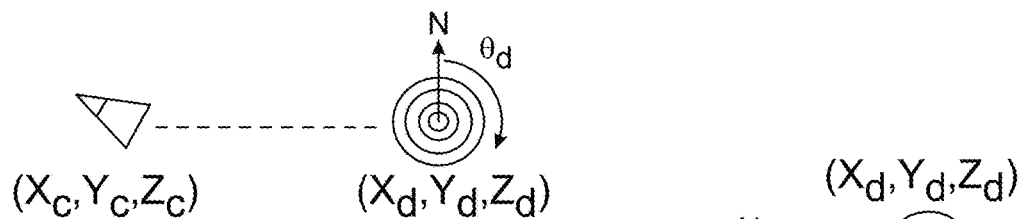
FIG. 13 is an illustration showing move to point behavior according to an embodiment of the disclosure.

FIG. 13 shows an illustration of move to point behavior according to an embodiment of the disclosure. Move to point's input is a single desired waypoint ($x_d$, $y_d$, $z_d$) and an optional desired yaw $\theta_d$. When an actor is assigned to a move to point objective the desired waypoint is sent to the low-level controller for execution once. If a desired yaw is present, that is the final orientation. If no desired yaw is present, the actor does not re-orient itself upon arrival at the waypoint. The main difference between a move to point objective and a Manual Waypoint command is that a move to point objective is for the network to accomplish, whereas a Manual Waypoint is specified for a specific actor, forcing the user to select who should move to the waypoint. The move to point behavior allows the system to automatically assign which actors are best suited to visit the waypoints. The simple cost estimate for this behavior is based on the estimated time to arrive at the point, which is derived from the straight-line distance to the point and the maximum speed of the agent.

Figure 14:
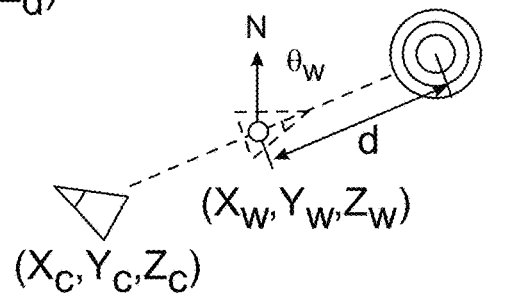
FIG. 14 is an illustration showing look to point behavior according to an embodiment of the disclosure.

FIG. 14 is an illustration of look at point behavior according to an embodiment of the disclosure. The desired waypoint to be viewed ($x_d$, $y_d$, $z_d$) as well as the distance to look from (d) are required parameters. In one embodiment, a default distance of 2 meters was used, but the user could override this parameter to give any non-negative viewing distance. The vehicle forms a line connecting its current position ($x_c$, $y_c$, $z_c$) to the desired waypoint ($x_d$, $y_d$, $z_d$) and then finds the point on that line a distance d from the desired waypoint, ($x_w$, $y_w$, $z_w$). This point and the orientation from this point to the desired waypoint, $\theta_w$, are then sent to the low-level controller for execution. The cost is estimated based on the distance to the viewing point and the maximum agent speed.

Figure 15:
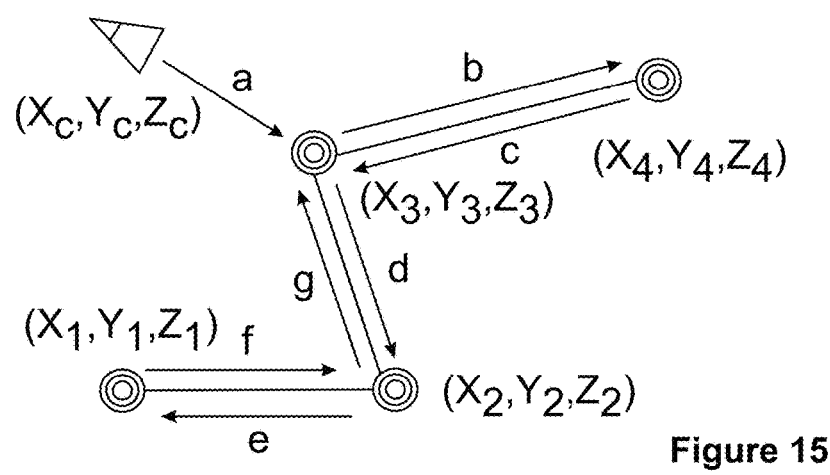
FIG. 15 is an illustration of move along line behavior according to an embodiment of the disclosure.

FIG. 15 is an illustration of move along line behavior according to an embodiment of the disclosure. The line segment is specified as a sequence of waypoints, ($x_i$, $y_i$, $z_i$). An assigned actor first determines which of the waypoints is the closest and heads to that waypoint first. Once there it pauses for a certain amount of time, 5 seconds is the current default value, but this can be overridden. Then it moves to the next highest index in the list of waypoints, pausing upon arriving at each waypoint. Once it reaches the top of the list of waypoints it begins to work down the list of waypoints, visiting them in descending order. Once it reaches the bottom of the list of waypoints it again reverses list direction. This cycle continues indefinitely. The cost is estimated based on the transient distance required to reach the closest waypoint on the list as well as the steady state cyclic distance of executing one full cycle along the line.

Follow target behavior leverages code from the look at point behavior. The behavior required the actor ID of the target to be followed and a desired distance (d) to follow behind. The assigned actor would match the target's actor ID from the objective specification to received actor packets to determine the position of the actor to be followed ($x_d$, $y_d$, $z_d$). This is enough information to calculate the desired waypoint for following: ($x_w$, $y_w$, $z_w$) and $\theta_w$, just as in the look at point behavior. This would be periodically repeated (currently at 1 Hz) to update the desired waypoint based upon changes in the target's position and changes in the actor's position. If the target became closer than the desired distance (d) the actor would simply stop translating forwards and rotate in place to keep the camera pointed at the actor. This is useful when the target takes sharp turns or reverses direction. The cost estimate for this behavior is based on the straight-line distance to the target and the maximum speed of the agent.

Further according to the present disclosure, linear swarm control may be used to ensure stable consensus of simple homogeneous vehicles performing basic tasks in computationally and communications bandwidth limited networks. Tasks are generally constructed to use the asset position as the system output—e.g. by spreading uniformly around a perimeter, taking and maintaining a formation, or converging to a source. This limits the applicability of these methods to relatively simple missions.

Figure 16A:
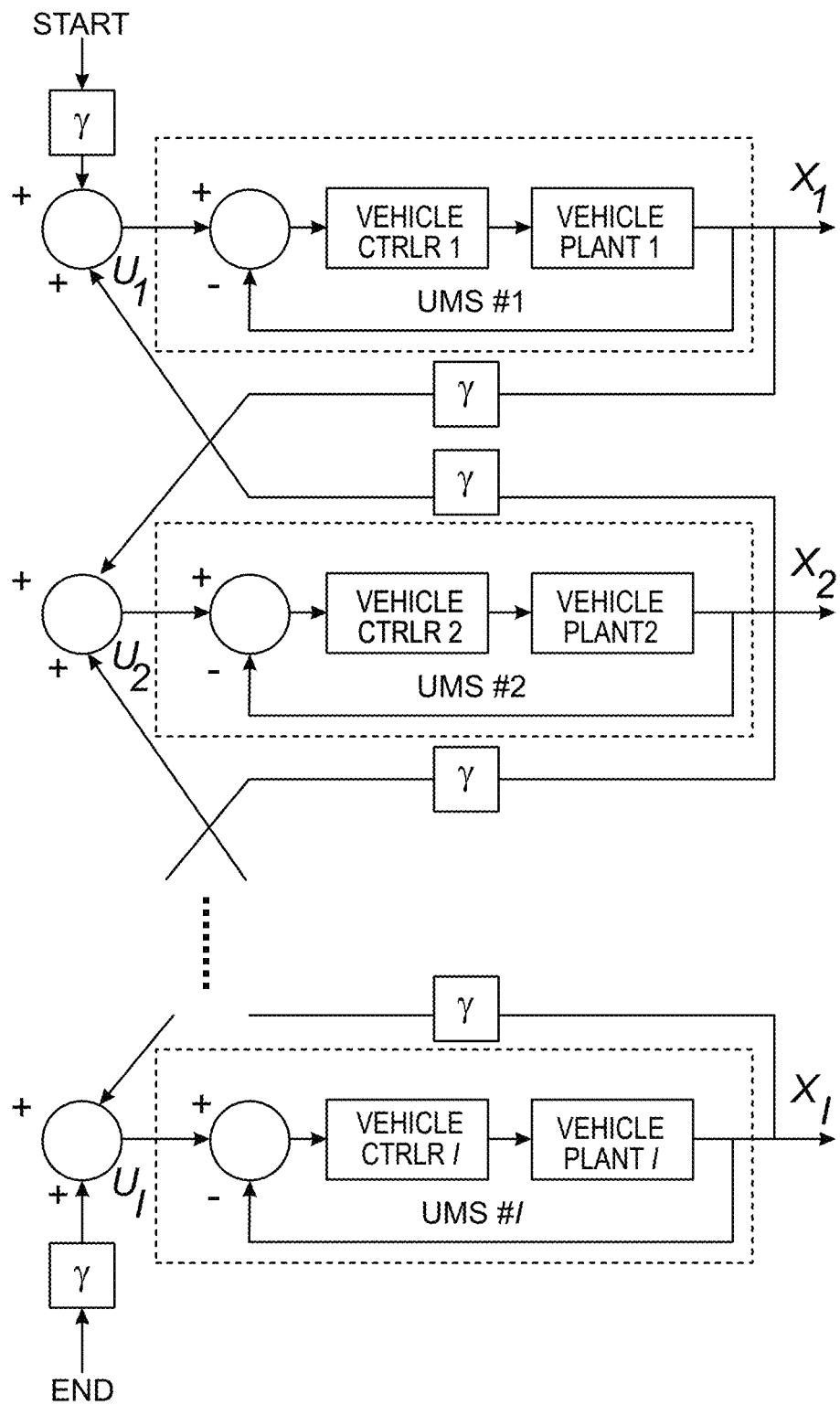
FIG. 16A shows a schematic representation of a 1D network of interacting vehicles according to an embodiment of the invention.
Figure 16B:
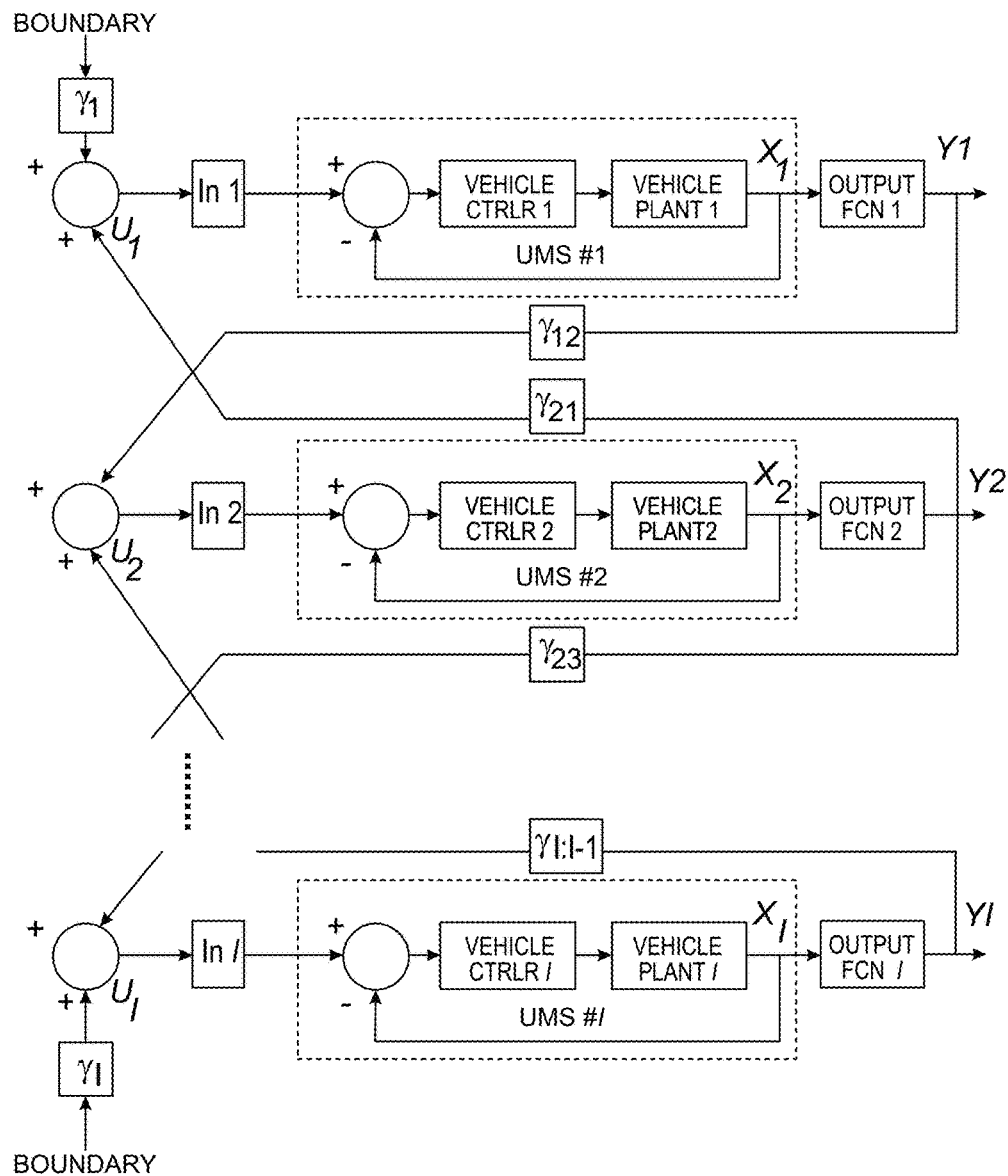
FIG. 16B shows a schematic representation of a 1D network of interacting vehicles according to another embodiment of the invention.

This approach can be extended to take advantage of some types of heterogeneity between vehicles, and to optimize against certain mission requirements. FIGS. 16A and 16B show schematic control block diagrams for two similar systems of l vehicles interacting along a 1D space (line). In each case, the $i^{th}$ vehicle's position is described by the state variable $x_i$. FIG. 16A shows a system of l identical vehicles. The vehicle position is the only variable shared among the assets, and all interaction gains are equal. Each vehicle knows the location of its nearest neighbors and incorporates that information into its control input $u_i$, multiplying first by the interaction gain $\gamma$, producing the following velocity control input for the $i^{th}$ vehicle:

$$u_i = \gamma(x_{i-1} + x_{i+1}) \quad (3)$$

If start and end positions are provided to the 1st and lth vehicles in this network (as shown in the diagram), $\gamma$ is properly selected, and the vehicles have simple dynamics (e.g. proportional control gains and first-order vehicle plant dynamics), then over time the vehicles will converge to an equal spacing along the line. This result has been proven to extend to very large numbers of vehicles.

FIG. 16B shows a method of incorporating heterogeneity among the vehicles in the network. The vehicles are heterogeneous and an Output Function converts vehicle position into operationally meaningful variables, which are shared between assets. Interaction gains $\gamma$ are also heterogeneous. Differences might be in individual vehicle plant characteristics (e.g. aerial versus ground vehicles), controllers (e.g. different maximum speeds), or capabilities (e.g. sensor suites) of different vehicles. This second architecture also enables tasks to be shared in more complex ways than simply by arranging position of the vehicles. This is accomplished with the addition of the "Output Function" block to each vehicle. This block translates the vehicle location $x_i$ into output behaviors $y_i$ $f(x_i)$ that are meaningful to the task. For example, the Output Function could define the area that falls within the view of a camera (the viewshed) based on the vehicle location. The vehicles then share information about their performance at the task (e.g. viewsheds) rather than about their locations. An "Input Function" ("In") may be used for each vehicle to translate information about neighboring vehicle viewsheds into appropriate control inputs.

Heterogeneity can also be reflected by varying the interaction gains between vehicles. In the homogeneous example (left side of FIG. 16), equal $\gamma$ across all vehicles ensures equal spacing between them at steady state. The $\gamma x_i$ contribution to the command input for vehicles i−1 and i+1 effectively repels the latter two vehicles from vehicle i. Therefore, increasing $\gamma i$ only, while keeping $\gamma$ constant for all other vehicles, will increase the extent to which i's neighbors are repelled by i, and ultimately increase the separation between i and its neighbors. This may be desirable if vehicle i is particularly effective at the task measured by the output variable. In this sense, the interaction gains on the output of the $i^{th}$ vehicle can be loosely understood to reflect the quality of performance of the vehicle in the task space, relative to the performance of the other vehicles at the same task.

Figure 17:
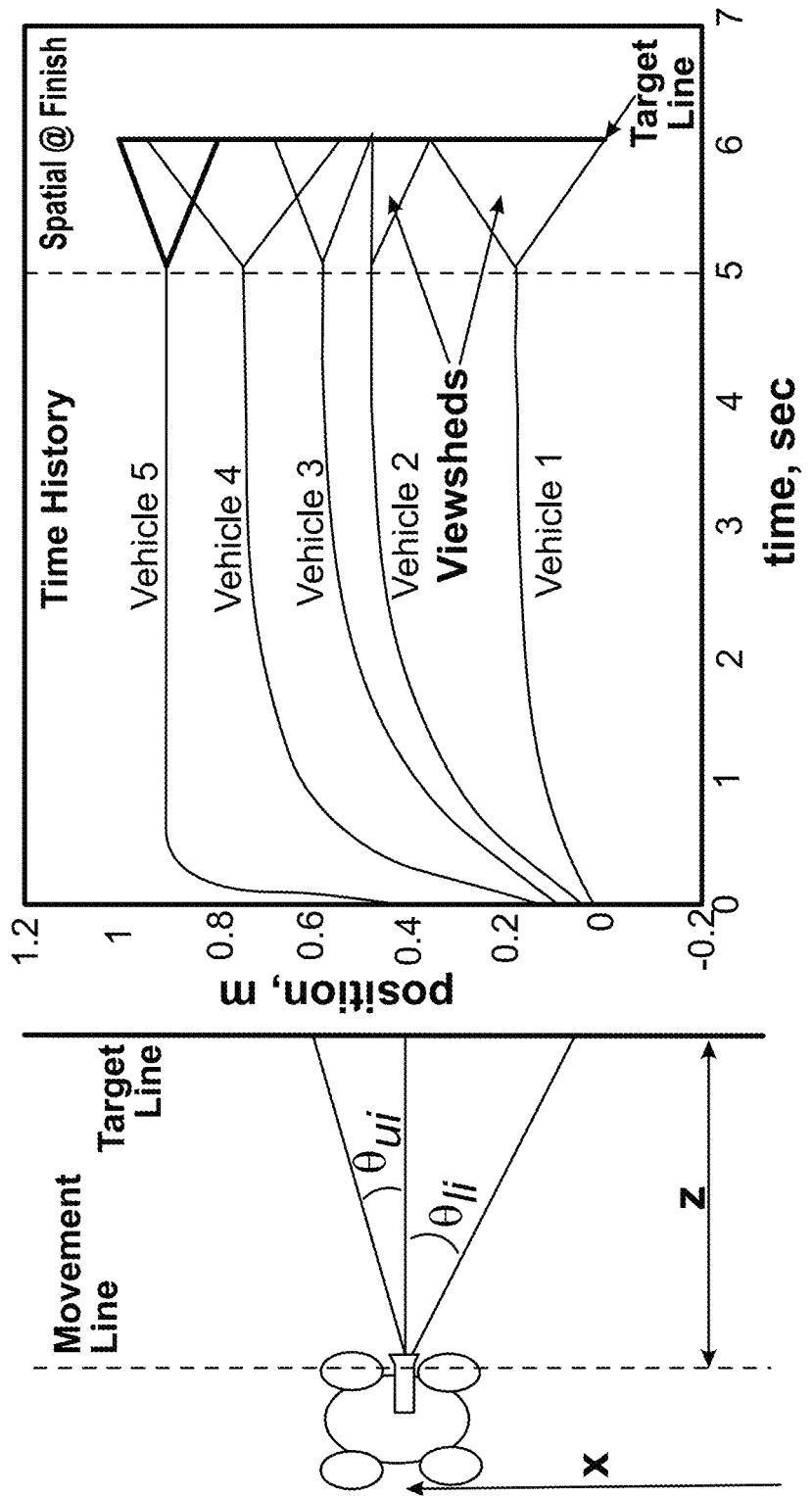
FIG. 17 shows the results of a simulation of a simple collaborative mission by heterogeneous vehicles according to an embodiment of the invention.

FIG. 17 shows the results of a simulation of a collaborative mission by heterogeneous vehicles according to an embodiment of the disclosure. In this simulation, five ground vehicles were constrained to move along the same line. Each is outfitted with a camera, and the cameras can have different fields of view and different resolutions, creating heterogeneity between the vehicles. All cameras face perpendicular to the line of movement, and the task goal is to optimize camera coverage of a second target line that runs parallel to the line of movement at a distance z.

In this example, the output variable $y_i$ quantifies camera coverage on the target line, and can be represented as a minimum and maximum boundary value depending on the state $x_i$:

$$y_i = \begin{bmatrix} y_i(a) \\ y_i(b) \end{bmatrix} = \begin{bmatrix} x_i + z\tan\theta_{ui} \\ x_i - z\tan\theta_{li} \end{bmatrix} \quad (4)$$

Here, $\theta_{ui}$ and $\theta_{di}$ are the upward- and downward-looking angles, respectively, that characterize the camera's viewshed, as shown in FIG. 17; vehicle i's camera covers the region between $y_i(b)$ and $y_i(a)$. The relevant (max or min) value is shared with the nearest neighbors in increasing and decreasing x, via the vehicle-specific interaction gain $y_{ij}$, such that:

$$u_i = \gamma_{i-1,i} y_{i-1}(a) + \gamma_{i+1,i} y_{i+1}(b) \quad (5)$$

The left pane of FIG. 17 shows the task and camera viewshed definition. In the right pane of FIG. 17, to the left of the dashed line are time histories of vehicle movement along the vehicle line. To the right of the dashed line is the target line and triangles representing camera viewsheds for each vehicle in the final position.

Each camera has a different viewshed, and the camera on vehicle 2 is asymmetric ($\theta_{u2} \neq \theta_{l2}$). The camera on vehicle 4 has much lower resolution than those on the rest of the vehicles, and this is reflected in the fact that $$\gamma_{4j} \ll \gamma_{ij} \forall j, i \neq 4 \quad (6)$$

Thus, the goal is to cover all of the target line with camera viewsheds, and to maximally overlap the viewsheds from other cameras with the camera on vehicle 4 to minimize the portion of the line that is only seen in that camera. FIG. 17 shows that this approach achieves the desired outcome. This provides an example of heterogeneous vehicles interacting through modified swarm control by sharing an operationally meaningful quantity (in this case camera coverage), rather than simply their location. This approach retains the computational simplicity of swarm control for heterogeneous collaboration, and can be extended to more complex geometries and mission objectives.

While it can be expanded to include heterogeneity, basic swarm control remains quite limited in dealing with important nonlinearities, such as deciding that vehicles should trade places in a task. We have developed an approach for distributed model predictive control (MPC) of several robotic vehicles. Optimal control such as MPC has great appeal in linking high-level objectives to quantitative behavior; however, an online optimization of an entire robot team is not practical due to the poor scalability of most optimization algorithms. Instead, the vehicles are considered separately and the optimization is partitioned such that each agent determines an optimal strategy based on knowledge of its own state plus that of some of its "neighbors," rather than the whole team. These neighbors may be selected based on physical proximity, some identification index, or asset category. The distributed implementation of locally optimal controls may then form an approximately optimal solution of the whole.

MPC has three key elements including: (1) a prediction model, (2) a performance index (or cost function) and (3) a method for obtaining the control law. At each time sampling instant, the initial state is determined through measurement or estimation, and a sequence of control inputs (assigned to discrete time intervals) is computed such that the predicted trajectories (and inputs) minimize the performance index subject to constraints. The first control in the sequence is applied to the system, the time index is incremented, and the remaining controls in the sequence are used to initialize the subsequent optimization. MPC has been used for both wheeled and flying robots.

For a system comprised of I assets and K objectives/targets, the assets and objectives have dynamic models. The asset models are given as $$\dot{x}_i = f_i(t, x_i, u_i) \quad (7)$$

for $i \in \{1, 2, \ldots, I\}$ where $x_i$ is the state of the $i^{th}$ asset and $u_i$ is the input. The asset state models are uncoupled; that is $\dot{x}_i$ is not a function of $u_j$ for $j \neq i$. The objective models are given as $$\dot{y}_k = \omega_k(t, y_k) \quad (8)$$

for $k \in \{1, 2, \ldots, K\}$ where $y_k$ is the state of the $k^{th}$ objective. This state may represent, for example, the evolving speed or location of a target. The overall multi-objective mission can be posed as an optimization wherein the objective costs are summed:

$$\begin{aligned}\operatorname*{minimize}_{u_1, u_2, \ldots, u_I} J(t_0, t_f, u_1(t), \ldots, u_I(t)) = \\ \sum_{k=1}^{K} \left( g_{\alpha k}(t_f, y(t_f), \alpha_k(t_f)) + \int_{t_0}^{t_f} F_{\alpha k}(\tau, \alpha_k(\tau)) d\tau \right) + \\ \sum_{i=1}^{I} \left( g_{xi}(t_f, x_i(t_f)) + \int_{t_0}^{t_f} F_{xi}(\tau, u_i(\tau), x_i(\tau)) d\tau \right)\end{aligned} \quad (9)$$

subject to constraints (i) $t \in [t_o, t_f]$ (defining the time horizon for optimization), (ii) $x \in \chi$ (defining the region of operations), (iii) $u_i(t) \in U_i$ (bounding permissible control inputs), and equations (7) and (8) where $g_{\alpha k} \geq 0$ and $F_{\alpha k} \geq 0$ are the final cost and the cost integrand respectively for the $k^{th}$ objective, $g_{xi} \geq 0$ and $F_{xi} \geq 0$ are cost terms associated with each asset, and $\alpha_k(t) \equiv \alpha_k(t, \bar{x}(t), y_k(t)) \geq 0$ where $\bar{x} = [x_1^T \ x_2^T \ \ldots \ x_I^T]^T$. The function implicitly determines an objective's priority and has been termed the "attention function." The general characteristics of an attention function are such that an "unattended" objective k results in a nondecreasing with time while for an objective k with at least one asset "acting" on it results in a nonincreasing $\alpha_k$. The cost integrand $F_{\alpha k}$ is always a nondecreasing function of $\alpha_k$.

To proceed, we define a set for each objective, as the subset of assets in the swarm that are capable of "acting" on objective k. Thus, the swarm agents are not physically coupled but are coupled locally instead through the performance index and through their opportunity to affect/accomplish the same objectives. Assignments must be made between assets and objectives.

When each objective is assigned an asset, the MPC solution for the ith asset is attained by solving an optimization $$\underset{u_i(t)}{\text{minimize}} J_{i,k}(t_0, t_f, u_i(t)) = \qquad (10)$$

$$g_{i,k}(t_f, x_i(t_f), \alpha_k(t_f)) + \int_{t_0}^{t_f} F_{i,k}(\tau, u_i(\tau), x_i(\tau), \alpha_k(\tau)) d\tau$$

subject to constraints (i) $t \in [t_O, t_f]$, (ii) $i \in \xi_k$, (iii) $x_i \in \chi$, (iv) $u_i(t) \in U_i$, and equations (7) and (8) where $g_{i,k}$ and $F_{i,k}$ are the final cost and the cost integrand respectively for the $i^{th}$ vehicle pursuing the $k^{th}$ objective, and $\alpha_k(t) \equiv \alpha_k(t, x_i(t), y_k(t))$. This correspondence is most intuitive when K≤I since the case allows a one-to-one assignment of assets to targets/objectives. This approach, however, requires one to determine the optimal assignment of assets and objectives and thus a set of discrete-valued decision variables.

System models that contain both continuous and discrete-event (switching) dynamics are known as hybrid systems. An optimal control problem for a hybrid system is to determine the continuous control input and select the decision control input so that the input and its resulting trajectory minimize a user-defined performance index. In practice, this optimization approach is NP-hard. However, we employ a simple algorithm to distribute this computational burden; at each time step, for vehicles l and m in the set of vehicles capable of acting on both objectives r and s (l,m∈$\xi_r \cap \xi_s$), a comparative evaluation of (10) is done for each asset-objective assignment and the minimum sum is used to select the assignment. Specifically, if $J_{l,s}+J_{m,r}<J_{l,r}+J_{m,s}$ then vehicle l is assigned objective s and vehicle m is assigned objective r. This is applied to each pair of vehicles in a given neighborhood at each time step, creating the continuous opportunity for vehicles to trade targets as the mission evolves.

Figure 18A:
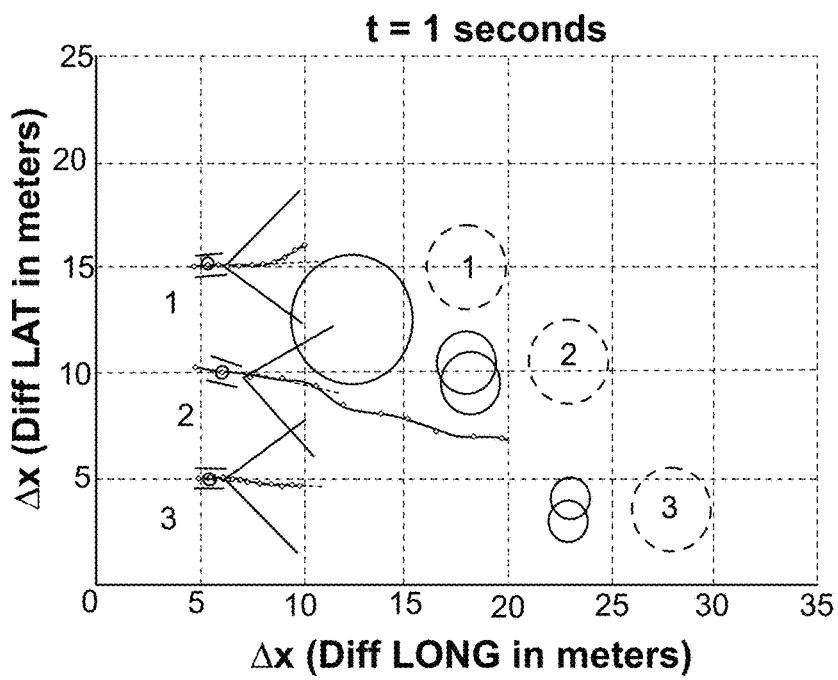
FIG. 18A shows the results of a simulation of a distributed model predictive control according to an embodiment of the disclosure.
Figure 18B:
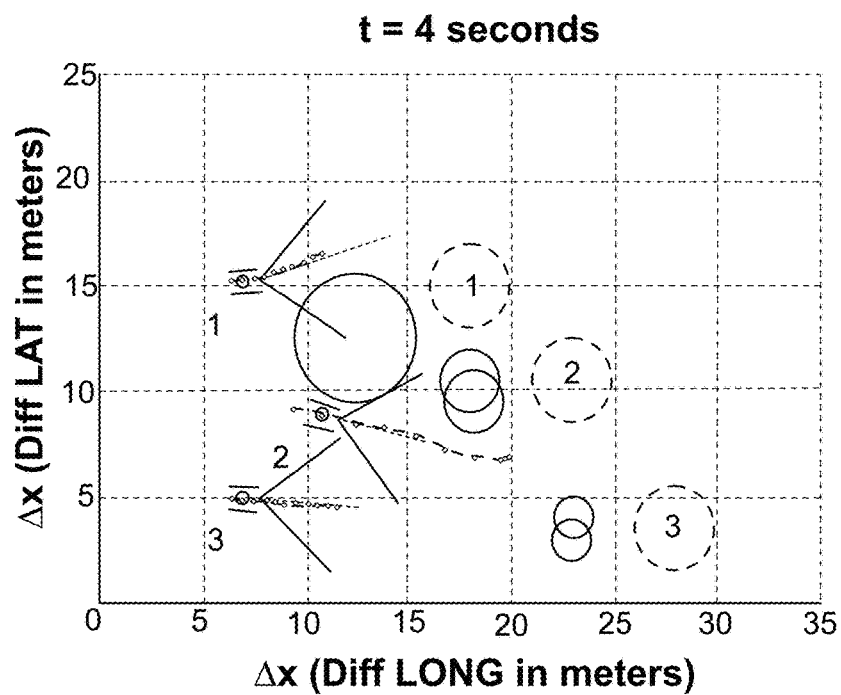
FIG. 18B shows further results of a simulation of a distributed model predictive control according to an embodiment of the disclosure.
Figure 18C:
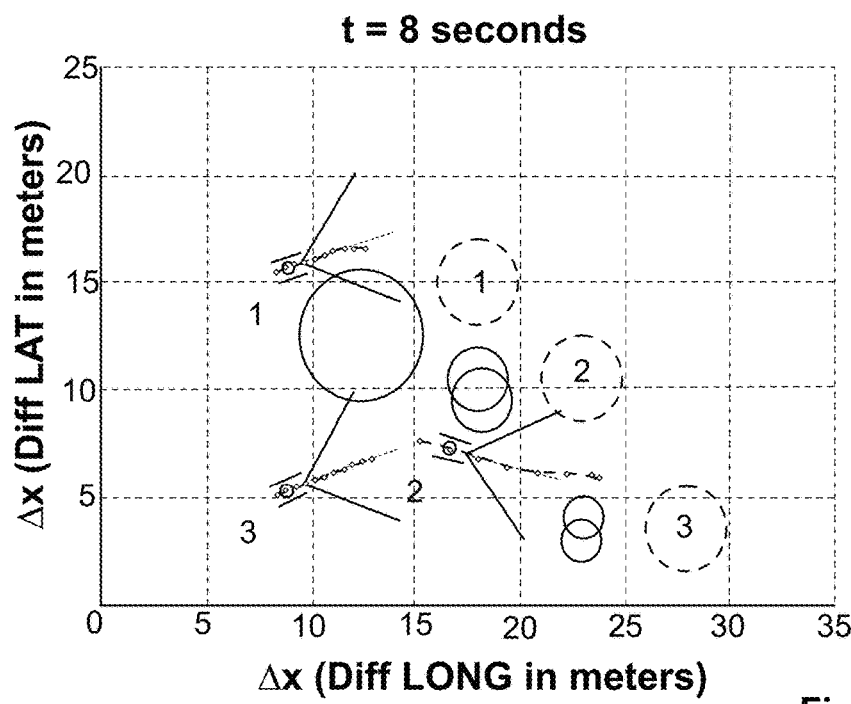
FIG. 18C shows further results of a simulation of a distributed model predictive control according to an embodiment of the disclosure.
Figure 18D:
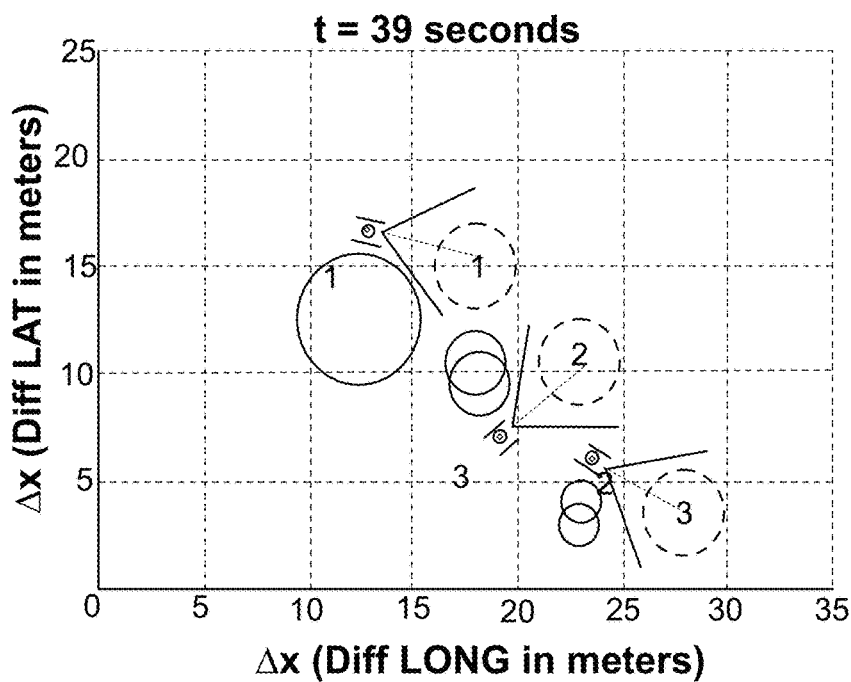
FIG. 18D shows further results of a simulation of a distributed model predictive control according to an embodiment of the disclosure.

FIGS. 18A, 18B, 18C and 18D show results of a simulation of a distributed model predictive control according to an embodiment of the disclosure. Three agent positions and projected trajectories are shown at FIG. 18A: t=1 sec, FIG. 18B: t=4 sec, FIG. 18C: t=9 sec, and FIG. 18D: t=42 sec. The three targets are numbered circles, obstacles are non-numbered circles. The objective is for the vehicles to position themselves such that each target is within the viewshed of one of the vehicle cameras. The optimization in equation (10) was expressed in discrete-time using direction collocation methods, and the simulation was performed in Matlab wherein the optimization was solved at each time step using the function fmincon from the Matlab Optimization Toolbox. The MPC optimization in each case was over a 10 second window with a 1-second time step. The only difference between the vehicles was the constraint on vehicle speed; vehicle 2 has a maximum speed of 3 m/sec while the others have a maximum speed of 1 m/sec. Obstacles were defined implicitly through the constraint on vehicle state $x_i \in \chi$. The resulting behavior shows that, in the beginning, vehicle 1 is assigned to objective 2, 2 to 1, and 3 to 3. At t=1 sec, vehicles 1 and 2 reassign based on a comparison of costs. As they progress toward their respective targets, vehicles 2 and 3 then reassign based on a comparison of costs at t=6 sec. Vehicle 2 uses its greater speed to ultimately select the furthest target even though vehicle 3 began the mission closer to it.

Figure 19:
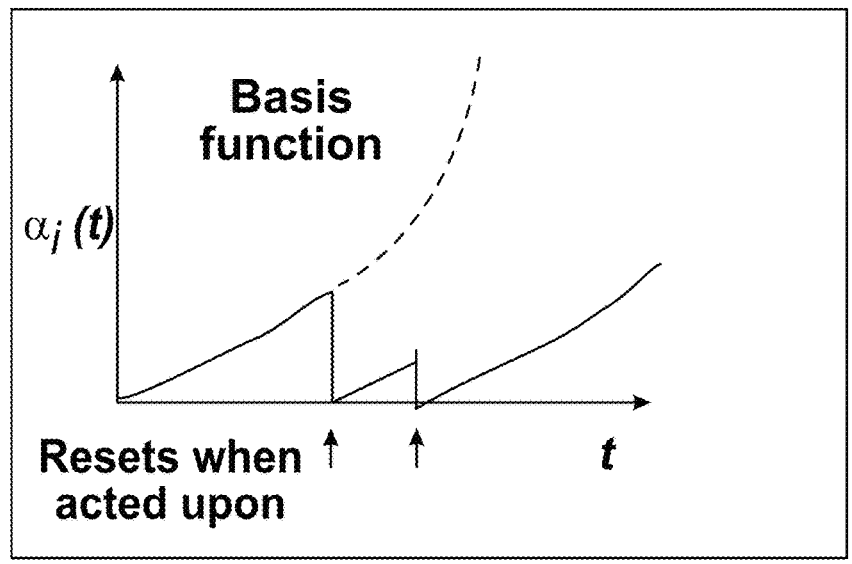
FIG. 19 illustrates an attention function according to an embodiment of the disclosure.
Figure 20:
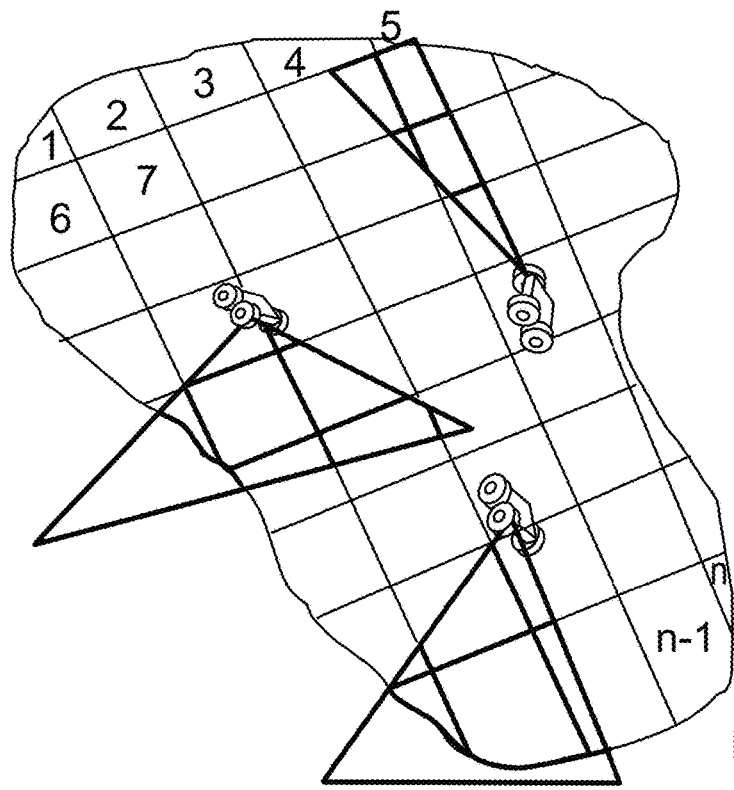
FIG. 20 shows a segmented area with attention functions for individual segments according to an embodiment of the disclosure.

Several types of more complex mid-level behaviors were also explored. To enable certain emergent behaviors, the concept of attention functions was developed. Attention functions are basis functions associated with particular objectives or targets that create simple, dynamic priority ratings that vary in time. An example of an attention function $a_i(t)$ is shown in FIG. 19. The function's characteristics are that it increases when the objective is not being addressed, and decreases or resets when the objective is addressed. The function can be used within control algorithms, for example as a multiplier in optimizations to quantify the time-dependent importance of competing objectives. If an objective is not addressed, its attention function increases, giving it greater weight in optimizations. Objectives that are addressed see their attention functions and relative weights decrease. This can prevent objectives from being continually neglected, and can enable cyclic behaviors to emerge, as competing objectives are addressed in a repeating sequence in time. For example, individual segments of an area as shown in FIG. 20 could be assigned independent attention functions associated with a "view area" behavior being executed by one or more vehicles with cameras. Attention functions for each individual segment would increase when the associated segment is out of view of all cameras, and would reset or decrease when it falls within the viewshed of one more cameras. When integrated with an appropriate algorithm, the result would be a movement of all agents to ensure that no segments are left without being observed for extended periods of time. Attention functions are captured in the AttentionList messages.

Figure 21:
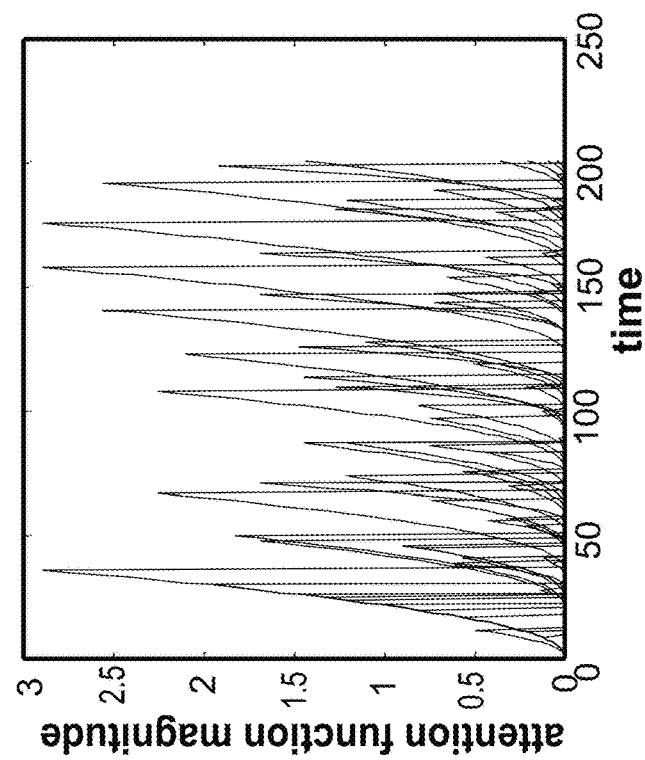
FIG. 21 shows the results of a multi-target attention function simulation according to an embodiment of the disclosure.
Figure 21:
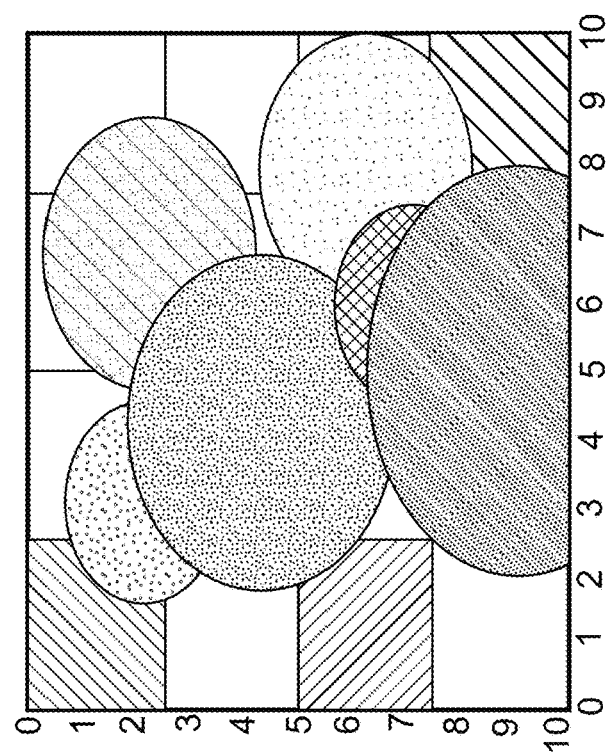

Attention functions may be applied at the high level to prioritize between objectives, or within MLBCs to achieve particular behaviors. FIG. 21 shows the results of a multi-target attention function simulation according to an embodiment of the disclosure. There are 16 rectangular spatial targets indicated by the rectangles in the left panel of FIG. 21. The shade of the rectangles indicates the present value of the attention function for each spatial target at the moment in time captured in the figure. The ovals represent the viewsheds of cameras on several vehicles. When each target is enclosed by a viewshed, its attention function resets to zero. In this case, the attention functions were used as attractors to draw the vehicles close; each region draws the vehicles more strongly as the attention functions increases. The right panel of FIG. 21 shows the magnitude of all 16 attention functions versus time. Each function increases when unattended, and resets when attended. Even with this very simple, non-optimized control approach, all targets are visited repeatedly and attention functions are held to modest values. This approach also provides a seamless way of transitioning between static and dynamic collective control solutions. For example, if the agents in the system shown in FIG. 21 are able to find a pose in which all spatial targets are attended to at one time, they will all stop moving and hold that pose. If an agent is removed or a target is added such that this is not possible, they will begin moving again to cyclically visit targets.

Through the use of attention functions, complex behaviors may be realized for situational awareness applications. In particular, by assigning attention functions to locations or milestones along a path or border, a sentry robot will "patrol" this border, visiting each location until the associated attention function is appropriately attenuated. The order in which each milestone is visited may be designated by staggering the initial conditions. If the attention function values of unattended milestones increases, the robot is will return to that milestone, resulting in a cyclical sentry behavior.

In the next few paragraphs, the issue of monitoring several targets/actors from a single agent, the overwatch asset, is addressed. This agent may be a UAV or ground vehicle positioned on high ground. The overwatch asset must spend a limited quantity of time viewing each actor, cyclically bringing each into view so that the "best" situational awareness may be attained given the resource. This may be done using attention functions which continually re-prioritize based on how much camera time each actor gets and how recent.

It is assumed that the location or approximate location of all actors is known, and an attention function is assigned to each. In the intended implementation, the attention function will increase in value when the actor is not within sight (camera view) of the overwatch asset. As the actor comes into view, the attention function value will decrease. In this study, the attention functions were defined as follows $$\text{Actor in view: } \xi_i(k+1) = \gamma_1 \cdot \xi_i(k) \quad (11)$$

$$\text{Actor not in view: } \xi_i(k+1) = \gamma_2 \cdot \xi_i(k) \quad (12)$$

where $\xi_i(k) > 0$ is the value of the $i^{th}$ actor at time step k, $\gamma_1 > 1.0$ and $\gamma_2 < 1.0$.

A cost function formulation was selected such that cost is minimized when the camera view is centered on the actor(s) with highest attention function value(s). In practice, the actor and the camera view shed will have well defined boundaries; it would thus make sense to select an expression that returns zero when no part of the actor is visible by the camera. However, such discontinuities have been found to inhibit the performance of iterative optimization schemes. Thus, an expression that relaxes or blurs the actor location was selected: a Gaussian. Specifically, to allow for a continuous transition over the entire space, a Gaussian, centered at the actor location with deviation σ, is integrated over the rectangular view of the camera. See nonlinear program (NLP:1) below. When the camera view is centered on the target location, J is minimized, however when the actor is not in view of the camera, the cost is still non-zero and a distinct gradient exists, allowing for iterative solution. The formulation also allows more flexibility to include more than one vehicle in the camera view.

$$\underset{x}{\text{minimize}} J = -\sum_{i=1}^{N_t} \xi_i \left( \iint_{Camera\ View} \left(e^{-\frac{\|x - x_t\|}{2\sigma^2}}\right) dx dy \right)$$

where
$\xi_i > 0$ is the attention index given by (6) and (7)
x is the commanded camera location
$x_t$ is the target location
$N_t$ is the number of targets
(NLP:1)

Figure 22A:
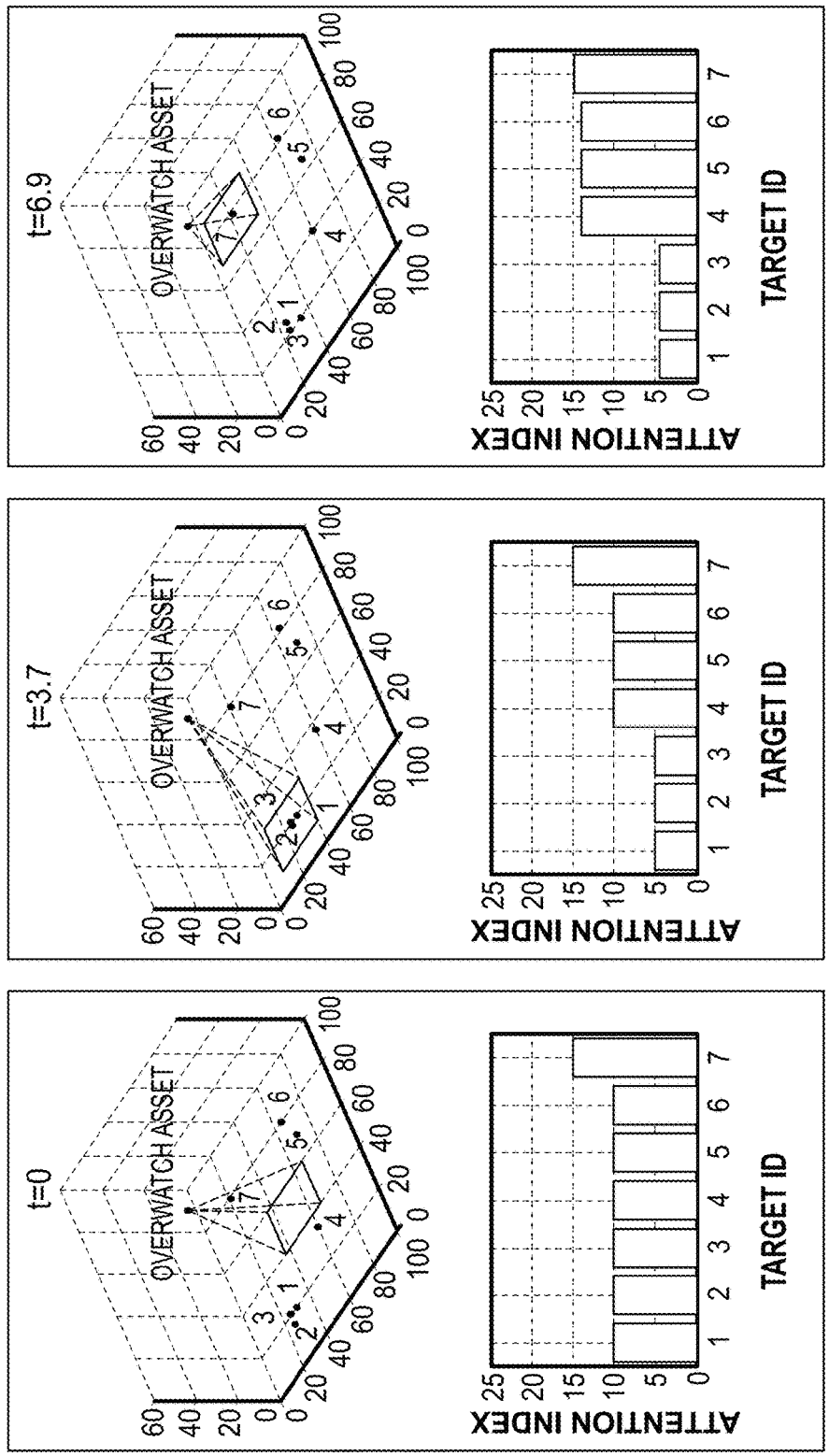
FIG. 22A shows the results of a simulation of an overwatch algorithm with seven moving actors.
Figure 22B:
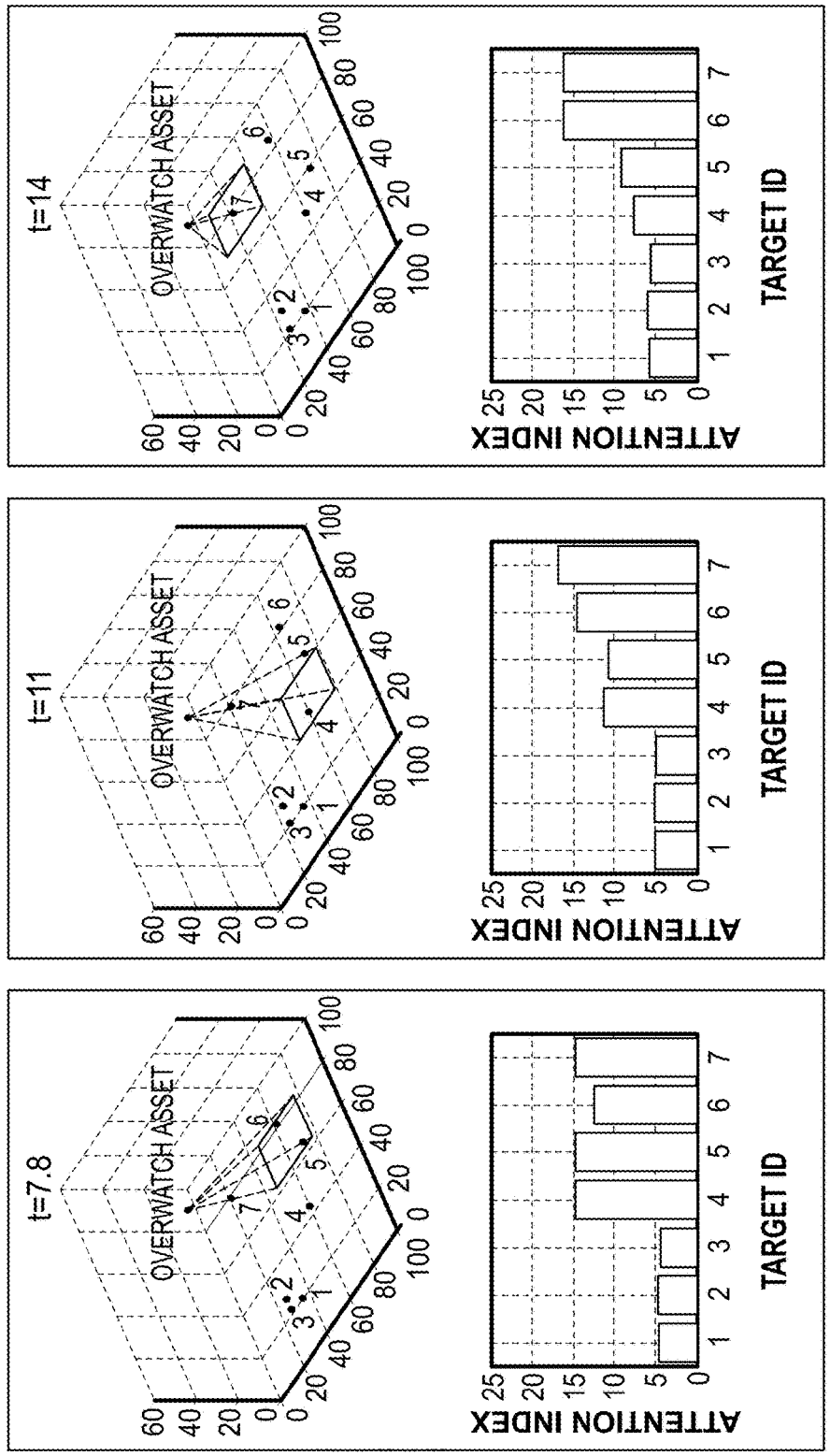
FIG. 22B shows further results of a simulation of an overwatch algorithm with seven moving actors.
Figure 22C:
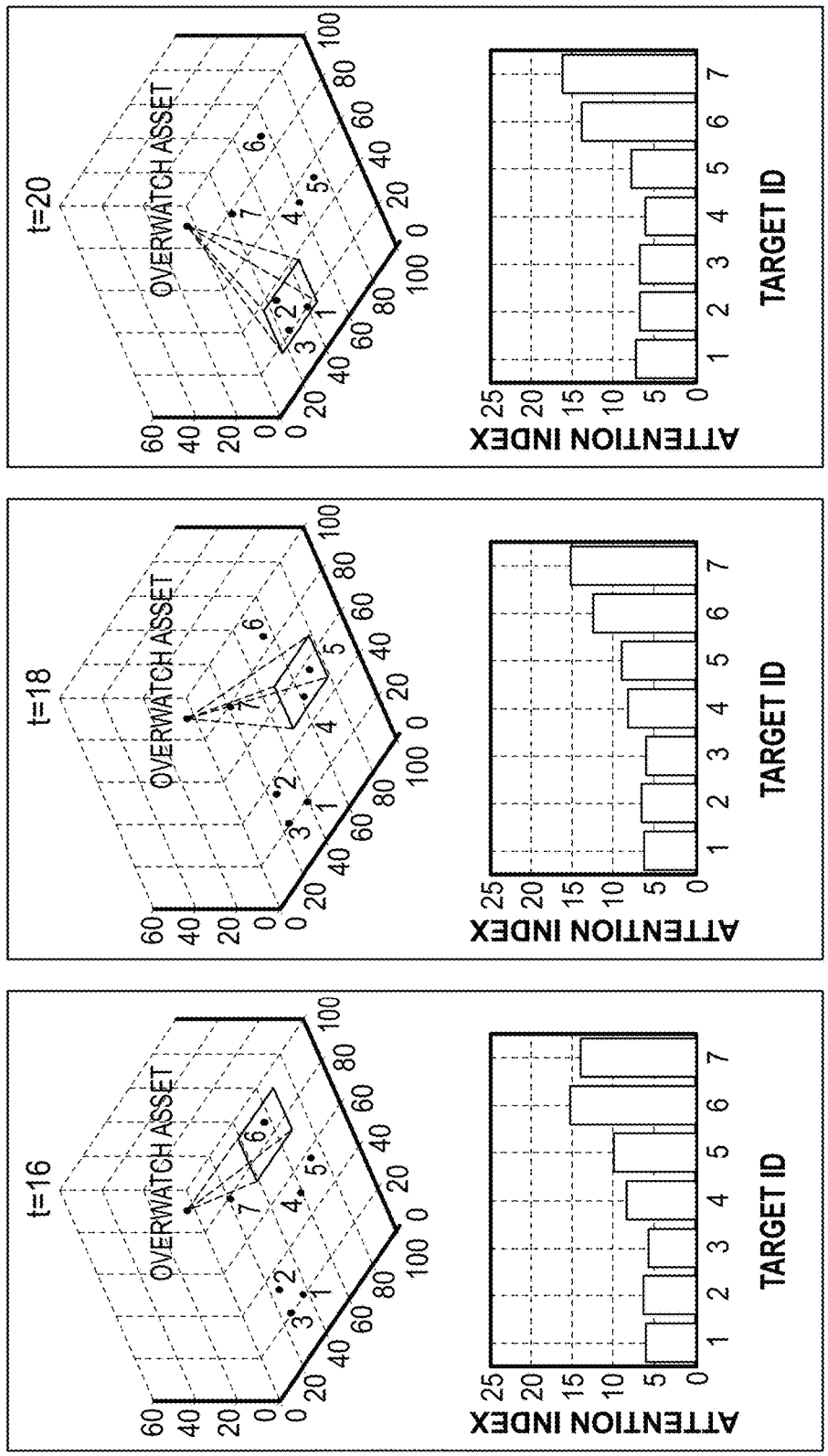
FIG. 22C shows further results of a simulation of an overwatch algorithm with seven moving actors.

To illustrate the performance of this algorithm, a 60 second simulation was done wherein seven moving ground actors covering a 100 meter×100 meter area were monitored by an overwatch asset positioned 50 meters above the ground. Several screenshots illustrating the behavior of the overwatch asset are given in FIGS. 22A, 22B and 22C. At t=0 (FIG. 22A), the system is in its initial condition. Actor 7 has the highest attention index value but actors 1,2 and 3 are clustered; so, the overwatch algorithm favors a camera position centered over the mean position of these actors. At t=3.7 (FIG. 22A), the attention indices of actors 1,2 and 3 have dropped, and the new favored camera position is over actor 7. Once the attention index of 7 has been reduced, the algorithm chooses a camera position over actors 5 and 6; in the t=7.8 second frame (FIG. 22B), the overwatch asset appears to be "trying" to fit both actors in one camera frame. Once these attention indices are reduced, actor 4 has the highest-valued attention index and the camera positions itself over it; however, at t=11 (FIG. 22B), one sees that the camera view is not perfectly centered over actor 4 since nearby actor 5 is still influencing the camera position. The algorithm then begins to cycle back through all actors, bringing each actor into view several times in the 60 second simulation. However, it does not necessarily do this in the same order in each cycle. FIG. 22C shows the actors at t=16s, t=18s and t=20s.

According to the present disclosure, the lowest major layer of control is composed of individual asset controllers. Each of these controllers by definition applies only to a single vehicle and is primarily concerned with moving the vehicle from the current state to a target state. Individual asset controllers are generally strict real-time controllers. In spite of this relatively simple goal, these controllers might include complex elements such as obstacle avoidance, sense-and-avoid, advanced path planning, adaptation to terrain or other conditions, etc. Navigation might rely on GPS, dead reckoning, model-based localization, or other methods of localization, or could even be open-loop. The minimum functionality required for a vehicle to be able to integrate with the SAHUC architecture is the simple ability to make controlled movement from one state to another.

According to the present disclosure, the operator's ability to efficiently populate and modify several of the system messages described above is critical to system performance. Of primary importance are the operator's interactions with the HeightMap, Teleoperation, ManualWaypoint, Objective and WeightList messages. Interaction with the HeightMap message allows the operator to manipulate the 3D map of the operating environment in response to his observations. Interaction with the Teleoperation and ManualWaypoint messages afford the opportunity for the operator to control the agents at lower levels, bypassing higher levels of control. Creation and manipulation of the Objective and WeightList messages allow the operator to direct high-level objective-based control by specifying and prioritizing objectives and by prioritizing general outcome priorities. We have developed tools to allow the operator to intuitively manipulate these structures.

The greatest performance may be achieved when the system has a three dimensional model of the operating environment (described and shared in the HeightMap structure). While Google Earth, GIS and other services provide 3D model information about much of the world, in many real-world operations this data will be unavailable or incomplete. However, even in many of these cases there is information that allows an operator to approximate some of the physical features of the environment. We have demonstrated methods to allow the operator to start from available data (e.g. satellite photos, terrain data) and apply his knowledge of the world to construct nominal 3D models of operating environments. We have developed a process, illustrated in FIG. 23, by which a satellite photo of an area can be imported (e.g. from Google Maps), and then augmented by the user by sketching 3D buildings registered to the locations shown in the satellite photos. The user makes assumptions about approximate building height based on the photos. The model can then be exported to the HeightMap format, shared among system agents, and subsequently updated and detailed using UMS sensor data. Agents may also use the HeightMap structure in combination with the local OccupancyMap structure for local navigation and for updating the model shared among agents.

Figure 23:
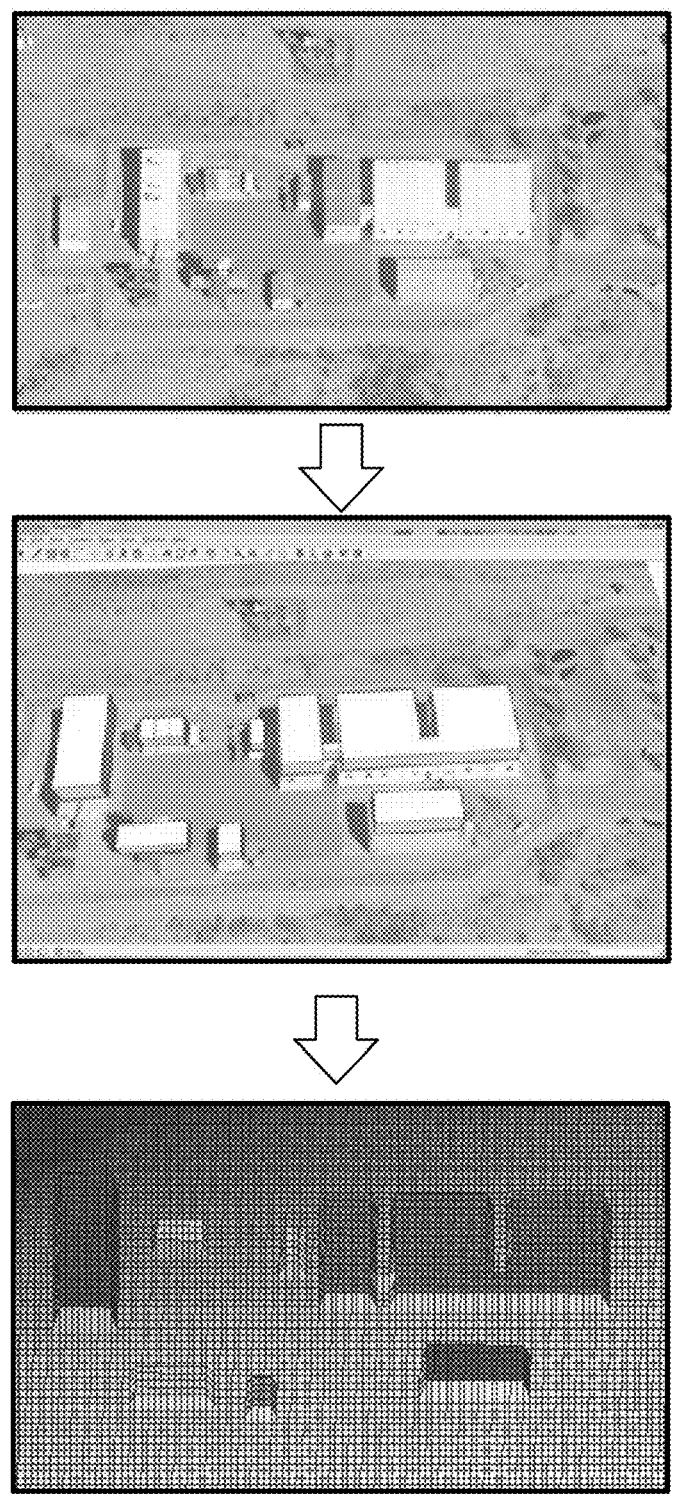
FIG. 23 shows an example of environmental panels from initial capture to system rendering according to an embodiment of the disclosure.

FIG. 23 shows environmental panels from initial capture to system rendering. As can be seen in FIG. 23, an operator imports a satellite photo of the operating area (top panel). The operator then use a 3D modeling tool to sketch 3D representations of buildings or other obstacles and objects, registering the sketched models to GPS coordinates via the satellite photo. Finally, the sketched model and reference coordinates can be exported to a HeightMap structure, plotted in the third panel. In this example, the HeightMap model is 2.5-dimensional (i.e. a single surface).

Figure 24:
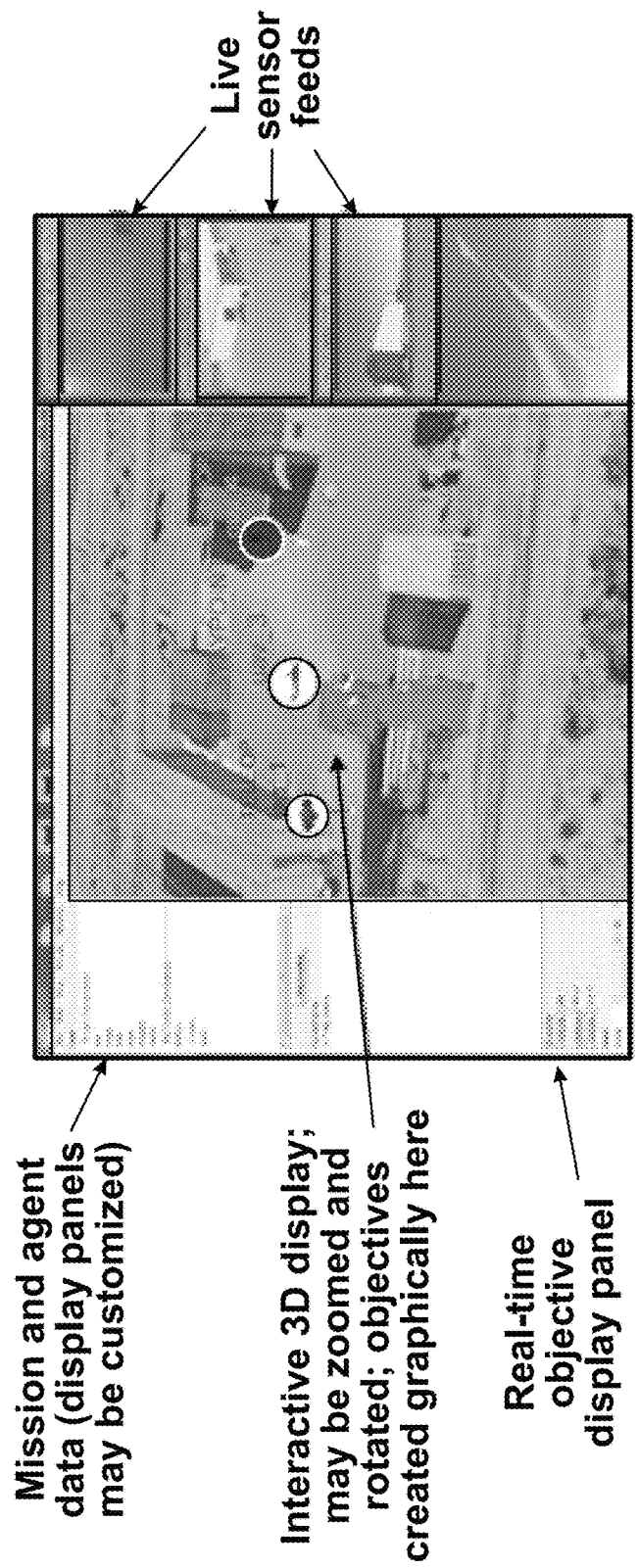
FIG. 24 shows an example of a screenshot of a user interface display including 3D view and live sensor feeds according to an embodiment of the disclosure.

Command and control tools—In real-time, the operator interfaces with the system through one or more user interfaces. FIG. 24 shows an embodiment where the operator's primary interactions with the system are through a GUI. The GUI could be implemented using any number of different software environments. In this example, the GUI was implemented within a modeling and simulation engine using elements of the scenario simulation tool. The use of a full 3D modeling/simulation engine enables seamless transitions between simulations and operations with live assets, including live-virtual-constructive (LVC) operations that use simulated and live elements simultaneously for development, algorithm testing, and operator training. The 3D environment provides the operator with a unified operational view of the battlespace and provides context to live sensor feeds. If a full simulation engine, rather than simply a 3D display, is used, performance metrics and complex calculations (such as sensor viewsheds in the presence of obstacles) can be computed in real-time and used for vehicle-level or team-level control algorithms. Custom graphical user interface (GUI) elements may be used to allow the operator to rapidly and intuitively instruct and correct the system. The simulation engine provides a platform via which different command and control interfaces may be rapidly prototyped and tested.

The GUI (screenshot in FIG. 24) centers around an interactive 3D display window that shows the terrain and all identified actors including team members, friends, foes, neutrals, or unidentified actors. This provides a reference so the user can comprehend the complex multi-agent interactions. Live sensor feeds are also provided, generally positioned on the right side (the GUI is fully reconfigurable). Expandable data fields are located on the left side, providing information about the agents in the system, reference geometry created by the operator, and model/terrain information. Interactive pop-up windows that allow observation and manipulation of agent modes and properties can be engaged either by clicking on the agent list in the left panel or directly on the icons representing each agent in the 3D display. In the bottom left panel, objectives are listed. When an operator creates an objective, it is added to this list. The operator may adjust the priorities of the objectives in this list, or temporarily or permanently disable objectives, removing them from consideration by the control system.

Teleoperation and Manual Waypoint Control—The operator creates Teleoperation messages by operating a gaming controller. To teleoperate an agent, such as a ground vehicle, the operator changes that vehicle's mode through the GUI; the GUI then begins streaming Teleoperation messages. Then velocity and angular velocity commands are generated through the gamepad and streamed to the vehicle through the Teleoperation message. If the operator places more than one vehicle into teleoperation mode, he can simultaneously operate multiple vehicles with the same joystick commands. This can be useful for driving several ground vehicles along parallel paths to a new operating area, for example.

To operate one or more vehicles by designating desired locations for them to move toward, the operator places the vehicle(s) into manual waypoint mode through the GUI. The operator may then provide new waypoints by first right-clicking on the vehicle using the mouse, selecting the command to issue a new manual waypoint, and then clicking a new point in space to indicate the desired new location. These waypoints are sent to the vehicle through the ManualWaypoint message.

High level Objective-based control—The operator commands and influences the mission predominately by manipulating the Objective messages. Objectives are generally referenced to one or more targets. Therefore the process of creating an objective sometimes begins with creating reference geometry. The operator may create points in space, lines (including multi-segment lines connecting an arbitrary number of points in space), or areas (enclosed by an arbitrary number of points), and subsequently associate objectives with these lines. For example, the operator might click "create line" in the left panel, then click an arbitrary number of locations in the 3D view to generate a multi-segment line, and then finally click the line itself (either in the 3D view or by clicking on its representation in the left panel) and associate an objective with it (for example "patrol line"). Objectives may also be associated with actors in the space. For example, "follow target" may be associated with an unknown party to ensure that one of the agents on the team shadows and observes the target. Similarly, "escort target" could be associated with a friendly agent to provide protection for a key asset as it moves around the space. Again, actors may be referenced to objectives either by clicking on the associated icon in the 3D model view, or by clicking on their name in the left panel.

The operator may also manipulate the WeightList message to prioritize competing high-level mission characteristics, for example trading speed or redundancy of execution against energy conservation. The WeightList message is modified using a pop-up window.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A method, comprising:
    assigning an objective to one or more unmanned vehicles by a user;
    estimating a cost to perform the objective by one or more agents;
    determining control instructions to be executed by one or more unmanned vehicles that minimizes a total cost of the objective;
    transmitting the control instructions to be executed by the one or more unmanned vehicles to the one or more unmanned vehicles;
    using a processor which functions as a high level optimizer to continue to estimate the cost and modify the assignment of the objective to minimize the cost during the performance of the objective;
    executing the objective while minimizing the cost of the objective; and transmitting sensor data from at least one of the one or more unmanned vehicles to the user;
wherein the cost is tunable during performing the objective by the user selecting between different cost metrics.

2. The method of claim 1, wherein executing the objective comprises executing individual or collaborative behavior of the one or more unmanned vehicles.

3. The method of claim 1, wherein assigning the objective comprises an objective location to be reached by at least one of the one or more unmanned vehicles.

4. The method of claim 1, wherein the assigning the objective comprises instructions by a user for at least one of the one or more unmanned vehicles to perform tasks at an objective location.

5. The method of claim 4, wherein the tasks are selected from a group comprising gathering sensor data, manipulating or grasping objects, switching to lower power states to conserve energy, positioning communications antennae to act as a relay, and delivering payloads.

6. The method of claim 1, wherein assigning the objective is executed by the processor which functions as the high level optimizer.

7. The method of claim 6, wherein the processor which functions as the high level optimizer is at least partially located at a user's location.

8. The method of claim 6, wherein the processor which functions as the high level optimizer is at least partially located at a location of at least one of the one or more unmanned vehicles.

9. The method of claim 1, wherein determining control instructions is executed by a processor which functions as a mid-level controller.

10. The method of claim 9, wherein the processor which functions as the mid-level controller is at least partially located at a user's location.

11. The method of claim 9, wherein the processor which functions as the mid-level controller is at least partially located at a location of at least one of the one or more unmanned vehicles.

12. The method of claim 1, wherein estimating the cost to perform the objective is executed by a processor which functions as a mid-level controller.

13. The method of claim 1, wherein the objective comprises movement commands selected from a group comprising waypoints, spatial curves to move along, spatial areas through which to move, and spatial volumes through which to move.

14. The method of claim 1, wherein the objective comprises multi-agent behaviors.

15. The method of claim 1, wherein at least one of the one or more unmanned vehicles is selected from a group consisting of unmanned ground vehicles, unmanned aerial vehicles, unmanned water vehicles and unmanned underwater vehicles.

16. The method of claim 1, wherein the one or more unmanned vehicles comprises two or more unmanned vehicles.

17. The method of claim 16, wherein determining control instructions to be executed by the two or more unmanned vehicles comprises determining which unmanned vehicle can perform the objective at a minimum cost.

18. The method of claim 1, further comprising:
modifying the objective by the user.

19. A non-transitory machine-readable medium in communication with at least one processor, the non-transitory machine-readable medium storing a system architecture having instructions, which, when executed by the at least one processor of a machine, causes one or more unmanned vehicles to perform one or more operations selected from a group consisting of moving to a location, delivering a package, and obtaining sensor data;
wherein the system architecture comprises at least one processor which functions as a high level optimizer that receives an objective from a user and at least one processor which functions as a mid-level behavior controller that receives an assignment list from the at least one processor which functions as the high level optimizer and provides an objective cost list to the at least one processor which functions as the high level optimizer thereby optimizing the objective performed by the one or more unmanned vehicles; and
wherein the at least one processor which functions as the high level optimizer continually updates the objective cost while the objective is being performed and updates the objective of one or more unmanned vehicles; and
wherein the objective cost is tunable during performing the objective by the user selecting between different cost metrics.

20. The non-transitory machine-readable medium of claim 19, wherein the at least one processor which functions as the high level optimizer is centralized at a user interface.

21. The non-transitory machine-readable medium of claim 19, wherein the at least one processor which functions as the high level optimizer is distributed with the one or more unmanned vehicles.

22. The non-transitory machine-readable medium of claim 19, wherein the at least one processor which functions as the mid-level behavior controller is distributed to the one or more unmanned vehicles.

23. The non-transitory machine-readable medium of claim 19, wherein the system architecture further comprising a low-level control architecture distributed to the one or more unmanned vehicles.

24. The non-transitory machine-readable medium of claim 19, wherein upon completion of the operation, the one or more unmanned vehicles performing the one or more operations reports results of the one or more operations to the user.

25. A system, comprising:
a user interface;
at least one processor of a machine;
at least one processor which functions as a high level optimizer module configured to receive an objective from the user interface;
at least one processor which functions as a mid-level behavior controller configured to determine a cost associated with the one or more unmanned vehicles performing the objective; and
one or more agents configured to receive the objective from the at least one processor which functions as the mid-level behavior controller;
wherein the system continuously updates the cost and modifies the objective of one or more unmanned vehicles; and
wherein the cost is tunable during performing the objective by the user selecting between different cost metrics.

26. The system of claim 25, wherein at least one unmanned vehicle of the one or more unmanned vehicles has a sensor package.

27. The system of claim 26, wherein the sensor package is selected from a group consisting of visual and/or infrared (IR) cameras, chemical and/or biological detectors, radiation detectors, three dimensional imaging systems, seismic sensors, acoustic sensors, radars, range finders, temperature or pressure sensors.

28. The system of claim 25, wherein at least one of the one or more unmanned vehicles is mobile.

29. The system of claim 28, wherein the at least one mobile unmanned vehicle is selected from a group consisting of unmanned ground vehicles, unmanned aerial vehicles, unmanned water vehicles and unmanned underwater vehicles.

30. The system of claim 25, wherein at least one of the one or more unmanned vehicles is configured to gather sensor data, manipulate or grasp objects, switch to lower power states to conserve energy, position communications antennae to act as a relay, and delivering payloads.

31. The system of claim 25, wherein the at least one processor which functions as the high-level optimizer module is at least partially co-located with the user interface.

32. The system of claim 25, wherein the at least one processor which functions as the high-level optimizer module is at least partially co-located with the one or more unmanned vehicles.

33. The system of claim 25, wherein the at least one processor which functions as the mid-level behavior controller module is at least partially co-located with the user interface.

34. The system of claim 25, wherein the at least one processor which functions as the mid-level behavior controller module is at least partially co-located with the one or more unmanned vehicles.

* * * * *